(12) United States Patent
Tsushima et al.

(10) Patent No.: US 9,742,141 B2
(45) Date of Patent: Aug. 22, 2017

(54) LASER CHAMBER

(71) Applicant: Gigaphoton Inc., Tochigi (JP)

(72) Inventors: Hiroaki Tsushima, Oyama (JP); Kouji Kakizaki, Oyama (JP); Takashi Matsunaga, Oyama (JP); Takeshi Asayama, Oyama (JP); Hisakazu Katsuumi, Oyama (JP); Hiroshi Umeda, Oyama (JP); Hiroyuki Ikeda, Oyama (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 15/245,245

(22) Filed: Aug. 24, 2016

(65) Prior Publication Data

US 2016/0365696 A1 Dec. 15, 2016

Related U.S. Application Data

(63) Continuation of application No. PCT/JP2015/063602, filed on May 12, 2015.

(30) Foreign Application Priority Data

Jun. 5, 2014 (WO) .................. PCT/JP2014/064987
Oct. 30, 2014 (WO) .................. PCT/JP2014/078966

(51) Int. Cl.
*H01S 3/22* (2006.01)
*H01S 3/036* (2006.01)
(Continued)

(52) U.S. Cl.
CPC .............. *H01S 3/036* (2013.01); *H01S 3/038* (2013.01); *H01S 3/0384* (2013.01); *H01S 3/041* (2013.01);
(Continued)

(58) Field of Classification Search
CPC ........ H01S 3/038; H01S 3/036; H01S 3/0384; H01S 3/041; H01S 3/0407; H01S 3/225;
(Continued)

(56) References Cited

U.S. PATENT DOCUMENTS

| 5,319,663 A | 6/1994 | Reid et al. | |
|---|---|---|---|
| 5,771,258 A * | 6/1998 | Morton | .................. H01S 3/225 372/57 |
| 2007/0071047 A1 * | 3/2007 | Huang | .................... H01S 3/097 372/38.02 |

FOREIGN PATENT DOCUMENTS

| JP | S61-063072 A | 4/1986 |
|---|---|---|
| JP | H01-273375 A | 11/1989 |

(Continued)

OTHER PUBLICATIONS

International Search Report issued in PCT/JP2015/063602; mailed Aug. 11, 2015.
(Continued)

*Primary Examiner* — Kinam Park
(74) *Attorney, Agent, or Firm* — Studebaker & Brackett PC

(57) ABSTRACT

A laser chamber including a first space and a second space in communication with the first space may include: a first discharge electrode disposed in the first space; a second discharge electrode disposed in the first space to face the first discharge electrode; a fan disposed in the first space and configured to flow laser gas between the first discharge electrode and the second discharge electrode; a peaking condenser disposed in the second space; and an electrical insulating member configured to partition the first space and the second space from one another, and disposed to allow the laser gas to pass through between the first space and the second space.

6 Claims, 21 Drawing Sheets

(51) Int. Cl.
| | |
|---|---|
| *H01S 3/038* | (2006.01) |
| *H01S 3/041* | (2006.01) |
| *H01S 3/04* | (2006.01) |
| *H01S 3/225* | (2006.01) |
| *H01S 3/08* | (2006.01) |
| *H01S 3/097* | (2006.01) |
| *H01S 3/0971* | (2006.01) |
| *H01S 3/134* | (2006.01) |

(52) U.S. Cl.
CPC ......... *H01S 3/0407* (2013.01); *H01S 3/08004* (2013.01); *H01S 3/08009* (2013.01); *H01S 3/09702* (2013.01); *H01S 3/09713* (2013.01); *H01S 3/134* (2013.01); *H01S 3/225* (2013.01)

(58) Field of Classification Search
CPC .. H01S 3/08009; H01S 3/09702; H01S 3/134; H01S 3/08004
See application file for complete search history.

(56) References Cited

FOREIGN PATENT DOCUMENTS

| | | |
|---|---|---|
| JP | H03-088374 A | 4/1991 |
| JP | H04-163978 A | 6/1992 |
| JP | H04-307776 A | 10/1992 |
| JP | H07-111349 A | 4/1995 |
| JP | H10-223955 A | 8/1998 |

OTHER PUBLICATIONS

Written Opinion issued in PCT/JP2015/063602; mailed Aug. 11, 2015.

* cited by examiner

LASER CHAMBER

CROSS-REFERENCES TO RELATED APPLICATIONS

This application claims the benefit of International Patent Applications No. PCT/JP2014/064987 filed Jun. 5, 2014, and No. PCT/JP2014/078966 filed Oct. 30, 2014, which are incorporated herein by reference.

BACKGROUND

1. Technical Field

The present disclosure relates to a laser chamber.

2. Related Art

The miniaturization and increased levels of integration of semiconductor integrated circuits have led to a demand for increases in the resolutions of semiconductor exposure apparatuses (hereinafter referred to as "exposure apparatus"). Accordingly, advances are being made in the reduction in the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

In the current generation exposure technology, immersion exposure has been in use, for reducing the apparent wavelength of an exposure light source by filling the space between the projection lens of an exposure apparatus and a wafer with a liquid, and changing the refractive index of the space. In the case where immersion exposure is carried out using an ArF excimer laser apparatus as the exposure light source, the wafer is irradiated with ultraviolet light at a wavelength of 134 nm in water. This technology is referred to as ArF immersion exposure. The ArF immersion exposure may be referred to as ArF immersion lithography.

The spectral line width of the spontaneous oscillation of a KrF or ArF excimer laser apparatus is as wide as 350 to 400 pm. Therefore, chromatic aberration occurs in a laser beam (ultraviolet light) which is reduced and projected by a projection lens of the exposure device onto a wafer, and consequently the resolution is dropped. It is therefore necessary to narrow the spectral line width of the laser beam emitted from the gas laser apparatus to the extent that the chromatic aberration is negligible. The spectral line width may be referred to as "spectral width." Accordingly, the spectral width has been narrowed by providing a line narrowing module (LNM) having a line narrowing element in a laser resonator of the gas laser apparatus. Here, examples of the line narrowing element may include an etalon and a grating. A laser apparatus having a narrowed spectral width in this manner is referred to as a line narrowing laser apparatus.

CITATION LIST

Patent Literature

PTL1: U.S. Pat. No. 5,319,663
PTL2: Japanese Patent Application Laid-Open No. HEI4-163978
PTL3: Japanese Patent Application Laid-Open No. HEI7-111349
PTL4: Japanese Patent Application Laid-Open No. HEI3-088374
PTL5: Japanese Patent Application Laid-Open No. HEI1-273375
PTL6: Japanese Patent Application Laid-Open No. HEI4-307776

SUMMARY

According to a first aspect of the present disclosure, a laser chamber including a first space and a second space in communication with the first space may include: a first discharge electrode disposed in the first space; a second discharge electrode disposed in the first space to face the first discharge electrode; a fan disposed in the first space and configured to flow laser gas between the first discharge electrode and the second discharge electrode; a peaking condenser disposed in the second space; and an electrical insulating member configured to partition the first space and the second space from one another, and disposed to allow the laser gas to pass through between the first space and the second space.

BRIEF DESCRIPTION OF THE DRAWINGS

Hereinafter, selected exemplary embodiments of the present disclosure will be described with reference to the accompanying drawings.

DESCRIPTION OF EXEMPLARY EMBODIMENTS

Contents

Figure 1:
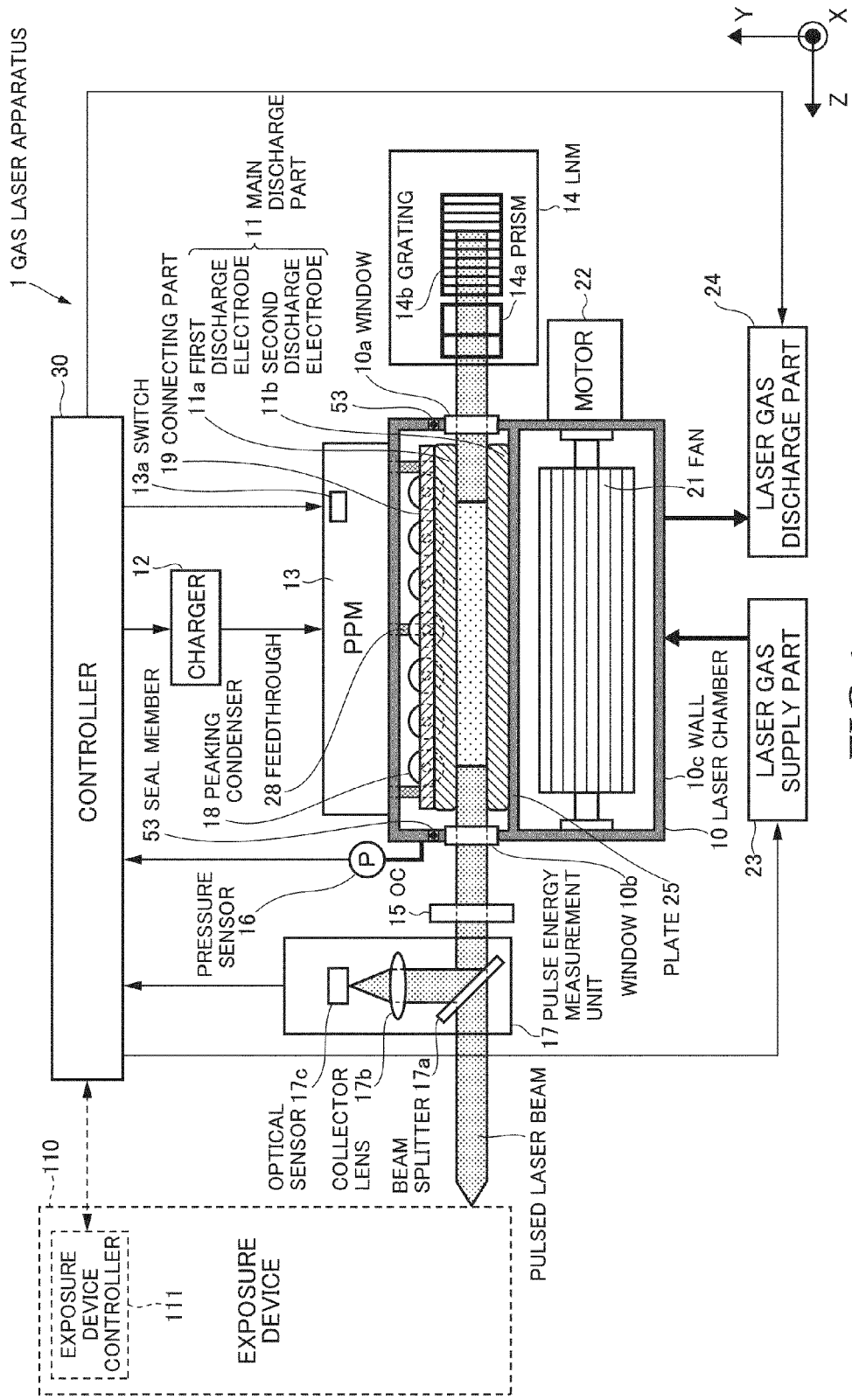
FIG. 1 schematically shows the configuration of a gas laser apparatus.

1. Overview
2. Description of terms
3. Gas laser apparatus
3.1 Configuration
3.2 Operation
3.3 Problem
4. Laser chamber including a refrigerant flow path
5. Laser chamber including an electrical insulating member
6. Laser chamber including a rectifying member
7. Laser chamber including an insulating wall member
8. Laser chamber formed by integrating a first container and a second container
9. Peaking condenser
10. Electrical insulating member
10.1 Configuration
10.2 Mounting structure
11. Others
11.1 Charge and discharge circuit used in the gas laser apparatus
11.2 Modification Hereinafter, selected embodiments of the present disclosure will be described in detail with reference to the accompanying drawings. The embodiments to be described below are merely examples and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview

The present disclosure may disclose at least the following embodiments.

A laser chamber 10 including a first space 51b and a second space 52b in communication with the first space 51b may include: a first discharge electrode 11a disposed in the first space 51b; a second discharge electrode 11b disposed in the first space 51b to face the first discharge electrode 11a; a fan 21 disposed in the first space 51b and configured to flow laser gas between the first discharge electrode 11a and the second discharge electrode 11b; a peaking condenser 18 disposed in the second space 52b; and an electrical insulating member 61 configured to partition the first space 51b and the second space 52b from one another, and disposed to allow the laser gas to pass through between the first space 51b and the second space 52b. With this configuration, the laser chamber 10 can improve the discharge efficiency.

2. Description of Terms

"Optical path axis" means an axis passing through the center of the beam cross-section of a laser beam along the traveling direction of the laser beam. "Optical path" means a path through which a laser beam passes. The optical path may include the optical path axis.

3. Gas Laser Apparatus 3.1 Configuration

Figure 2:
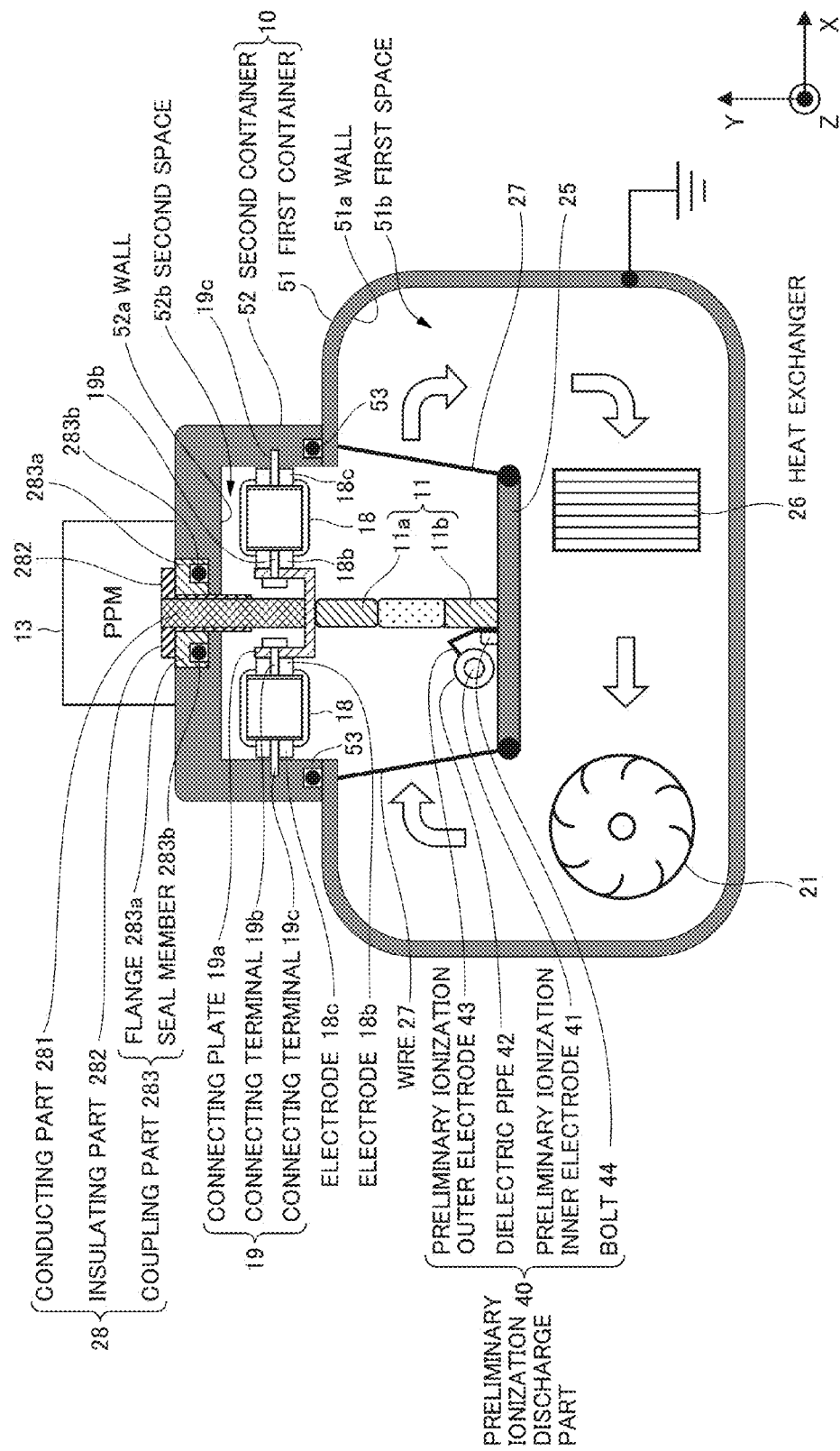
FIG. 2 is a cross-sectional view showing a laser chamber shown in FIG. 1 as viewed from a Z-axis direction.

With reference to FIGS. 1 and 2, the configuration of the gas laser apparatus 1 will be described. FIG. 1 schematically shows the configuration of the gas laser apparatus 1. FIG. 2 is a cross-sectional view showing the laser chamber 10 shown in FIG. 1 as viewed from a Z-axis direction. In FIG. 1, the traveling direction of a laser beam outputted from the gas laser apparatus 1 is defined as the Z-axis direction. That is, the direction in which the pulsed laser beam is outputted from the laser chamber 10 to the exposure device 110 is defined as the Z-axis direction. An X-axis and a Y-axis are orthogonal to the Z-axis, and are orthogonal to one another. The same definition of these coordinate axes will be applied to the other drawings described later.

The gas laser apparatus 1 may be a discharge excited gas laser apparatus. The gas laser apparatus 1 may be an excimer laser apparatus. Laser gas as a laser medium may include rare gas such as argon or krypton, halogen gas such as fluorine, and buffer gas such as neon or helium, or a mixture thereof.

The gas laser apparatus 1 may include the laser chamber 10, a laser resonator, a charger 12, a pulse power module (PPM) 13, a pressure sensor 16, a pulse energy measurement unit 17, a motor 22, a laser gas supply part 23, a laser gas discharge part 24, and a controller 30.

The laser chamber 10 may enclose the laser gas. The laser chamber 10 may include a first container 51 and a second container 52. The first container 51 and the second container 52 may be formed by using, for example, a metallic material such as aluminum metal. For example, nickel plating may be applied to the surface of the metallic material used for forming the first container 51 and the second container 52. A first space 51b may be formed in the first container 51 by a wall 51a of the first container 51. An opening may be provided in the wall 51a of the first container 51. A second space 52b may be formed in the second container 52 by a wall 52a of the second container 52. An opening may be provided in the wall 52a of the second container 52. The wall 51a of the first container 51 and the wall 52a of the second container 52 may be connected to ground.

The opening of the first container 51 and the opening of the second container 52 may have the same shape. The peripheries of the openings of the first container 51 and the second container 52 may be bonded to one another through a seal member 53. The seal member 53 may be, for example, an O ring. When the first container 51 and the second container 52 are bonded to one another through the seal member 53, the first space 51b inside of the first container 51 and the second space 52b inside of the second container 52 may communicate with one another while they are isolated from the outside.

Here, in the present embodiment, the first container 51 and the second container 52 may be collectively referred to as "laser chamber 10." In addition, the wall 51a of the first container 51 and the wall 52a of the second container 52 may be collectively referred to as "wall 10c" of the laser chamber 10.

The first container 51 may include the main discharge part 11, a preliminary ionization discharge part 40, a window 10a, a window 10b, a plate 25, a wire 27, a fan 21 and a heat exchanger 26. The second container 52 may include a peaking condenser 18, a connecting part 19 and a feedthrough 28.

The main discharge part 11 may excite the laser gas by a main discharge. The main discharge part 11 may be disposed in the first space 51b of the first container 51. The main discharge part 11 may include the first discharge electrode 11a and the second discharge electrode 11b. The first discharge electrode 11a and the second discharge electrode 11b may be a pair of electrodes to excite the laser gas by the main discharge. The main discharge may be a glow discharge. The first discharge electrode 11a and the second discharge electrode 11b may be formed by plate-like conductive members, respectively. The first discharge electrode 11a and the second discharge electrode 11b may be arranged to face one another with a predetermined distance therebetween, in approximately parallel with one another in their longitudinal direction. The first discharge electrode 11a and the second discharge electrode 11b may be arranged such that their discharge surfaces face one another. With the present embodiment, the direction in which the discharge surfaces of the first discharge electrode 11a and the second discharge electrode 11b face one another is defined as a Y-axis direction.

Here, with the present embodiment, space between the discharge surface of the first discharge electrode 11a and the discharge surface of the second discharge electrode 11b may be referred to as "discharge space." The laser gas enclosed in the laser chamber 10 may exist in the discharge space. The main discharge may be generated in the discharge space.

The first discharge electrode 11a may be a cathode electrode. The surface opposite to the discharge surface of the first discharge electrode 11a may be connected to the PPM 13 via the connecting part 19 and the feedthrough 28. The surface opposite to the discharge surface of the first discharge electrode 11a may also be connected to the peaking condenser 18 via the connecting part 19. The PPM 13 and the peaking condenser 18 may apply a pulse voltage to between the first discharge electrode 11a and the second discharge electrode 11b. The second discharge electrode 11b may be an anode electrode. The surface opposite to the discharge surface of the second discharge electrode 11b may be fixed to the plate 25.

The plate 25 may be disposed in the first space 51b of the first container 51. The ends of the plate 25 may be fixed to the wall 51a of the first container 51. The plate 25 may be formed with a conductive member. The plate 25 may be connected to the grounded wall 51a of the first container 51 via the wire 27. The plate 25 may be maintained at a ground potential.

The preliminary ionization discharge part 40 may be electrodes to preliminarily ionize the laser gas by a corona discharge prior to the main discharge by the main discharge part 11. The preliminary ionization discharge part 40 may be disposed in the first space 51b of the first container 51. The preliminary ionization discharge part 40 may be fixed to the plate 25. The preliminary ionization discharge part 40 may be disposed upstream of the flow of the laser gas with respect to the second discharge electrode 11b. The preliminary ionization discharge part 40 may include a preliminary ionization inner electrode 41, a dielectric pipe 42, a preliminary ionization outer electrode 43, and a bolt 44.

The dielectric pipe 42 may be formed in a cylindrical shape. The dielectric pipe 42 may be disposed such that its longitudinal direction is approximately parallel to the longitudinal direction of the main discharge part 11. The preliminary ionization inner electrode 41 may be formed in a rod shape. The preliminary ionization inner electrode 41 may be inserted into the dielectric pipe 42 and fixed to the inner periphery of the dielectric pipe 42. The end of the preliminary ionization inner electrode 41 may be connected to an output terminal of the PPM 13, which outputs a high voltage, via a feedthrough (not shown) and a preliminary ionization condenser $C_c$ (not shown). The end of the preliminary ionization inner electrode 41 may be connected to the peaking condenser 18. The preliminary ionization outer electrode 43 may be formed in a plate-like shape having a bending portion. The preliminary ionization outer electrode 43 may be disposed such that the top end of the bent preliminary ionization outer electrode 43 substantially contacts the outer periphery of the dielectric pipe 42 along the longitudinal direction of the preliminary ionization outer electrode 43. The preliminary ionization outer electrode 43 may be fixed to the second discharge electrode 11b or the plate 25 via the bolt 44.

The fan 21 may circulate the laser gas in the laser chamber 10. The fan 21 may be disposed in the first space 51b of the first container 51. The fan 21 may be a crossflow fan. The fan 21 may be disposed such that its longitudinal direction is approximately parallel to the longitudinal direction of the first discharge electrode 11a and the second discharge electrode 11b. The fan 21 may be disposed opposite to the discharge space with respect to the plate 25. The fan 21 may be rotated by driving the motor 22. The rotating fan 21 may generate the flow of the laser gas.

When the fan 21 is rotated, the laser gas in the laser chamber may be approximately uniformly blown out in the direction which is approximately perpendicular to the longitudinal direction of the fan 21. The laser gas blown out of the fan 21 may flow into the discharge space. The direction of the laser gas flowing into the discharge space may be approximately perpendicular to the longitudinal direction of the first discharge electrode 11a and the second discharge electrode 11b. The laser gas having flowed into the discharge space may flow out of this discharge space. The direction of the laser gas flowing out of the discharge space may be approximately perpendicular to the longitudinal direction of the first discharge electrode 11a and the second discharge electrode 11b. The laser gas having flowed out of the discharge space may be sucked into the fan 21 via the heat exchanger 26.

The heat exchanger 26 may perform a heat exchange between a refrigerant supplied into the heat exchanger 26 and the laser gas. The heat exchanger 26 may be disposed in the first space 51b of the first container 51. The amount of the refrigerant supplied into the heat exchanger 26 may be changed according to the control of the controller 30. When the amount of the supplied refrigerant is changed, the amount of the heat transferring from the laser gas to the refrigerant may be changed. By this means, it is possible to adjust the temperature of the laser gas in the laser chamber 10.

The peaking condenser 18 may receive an electrical energy to be applied to the main discharge part 11 and the preliminary ionization discharge part 40 from the PPM 13, and accumulate the electrical energy therein. The peaking condenser 18 may discharge the accumulated electrical energy to the main discharge part 11 and the preliminary ionization discharge part 40. A plurality of peaking condensers 18 may be disposed in the second space 52b of the second container 52. The plurality of peaking condensers 18 may be disposed at positions in the second space 52b, upstream and downstream of the flow of the laser gas with respect to the first discharge electrode 11a such that two or more of the peaking condensers 18 are disposed upstream and two or more of the peaking condensers 18 are disposed downstream. The plurality of peaking condensers 18 may be disposed along the longitudinal direction of the first discharge electrode 11a. An electrode 18b, which is one of the electrodes of each of the peaking condensers 18, may be connected to the PPM 13 via the connecting part 19 and the feedthrough 28. In addition, the electrode 18b, which is one of the electrodes of each of the peaking condensers 18, may be connected to the first discharge electrode 11a via the connecting part 19. Moreover, the electrode 18b, which is one of the electrodes of each of the peaking condensers 18, may be connected to the preliminary inner ionization electrode 41 via the connecting part 19 and the preliminary ionization condenser $C_c$. Meanwhile, an electrode 18c, which is the other electrode of each of the peaking condensers 18, may be connected to the wall 52a of the second container 52 via the connecting part 19.

The outer surfaces of the peaking condensers 18 may be coated with a material resistant to the laser gas. When the laser gas contains fluorine, the outer surfaces of the peaking condensers 18 may be coated with a fluorine-resistant material. The fluorine-resistant material with which the peaking condensers 18 are coated may be a fluorinated organic material or an inorganic material containing a fluoride. By this means, the peaking condensers 18 may not be easy to chemically react with the laser gas. As a result, the peaking condensers 18 may not be easy to deteriorate and discharge impurity gas due to the reaction with the laser gas. Here, the detailed configuration of the peaking condensers 18 will be described later with reference to FIGS. 10A to 15B.

The connecting part 19 may be a member to connect the peaking condensers 18 to other components. The connecting part 19 may be disposed in the second space 52b of the second container 52. The connecting part 19 may include a connecting plate 19a, connecting terminals 19b and connecting terminals 19c.

The connecting plate 19a may be constituted by a conductive plate having a U-shaped cross section. The connecting plate 19a may be disposed along the longitudinal direction of the first discharge electrode 11a. The connecting plate 19a may be disposed such that its bottom part faces the surface opposite to the discharge surface of the first discharge electrode 11a. The outer surface of the bottom part of the connecting plate 19a may be electrically connected to the surface opposite to the discharge surface of the first discharge electrode 11a. Meanwhile, the inner surface of the bottom part of the connecting plate 19a may be electrically connected to the feedthrough 28. Two side parts of the connecting plate 19a may be located upstream and downstream of the flow of the laser gas with respect to the first discharge electrode 11a, respectively. The side part of the connecting plate 19a located upstream of the flow of the laser gas with respect to the first discharge electrode 11a may be electrically connected to the electrode 18b of each of the plurality of peaking condensers 18 located upstream of the flow of the laser gas with respect to the first discharge electrode 11a via each of a plurality of connecting terminals 19b. Meanwhile, the side part of the connecting plate 19a located downstream of the flow of the laser gas with respect to the first discharge electrode 11a may be electrically connected to the electrode 18b of each of the plurality of peaking condensers 18 located downstream of the flow of the laser gas with respect to the first discharge electrode 11a via each of a plurality of connecting terminals 19b.

The connecting terminals 19b may electrically connect the electrodes 18b of the plurality of peaking condensers 18 to the side parts of the connecting plate 19a. By this means, the electrodes 18b of the peaking condensers 18 may be electrically connected to the first discharge electrode 11a by the connecting part 19 including the connecting plate 19a and the connecting terminals 19b. In addition, the electrodes 18b of the peaking condensers 18 may be electrically connected to the feedthrough 28 connected to the PPM 13, by the connecting part 19 including the connecting plate 19a and the connecting terminals 19b. In addition, the connecting terminals 19c may electrically connect the electrodes 18c of the plurality of peaking condensers 18 to the wall 52a of the second container 52. By this means, the electrodes 18c of the peaking condensers 18 may be electrically connected to the wall 52a of the second container 52 by the connecting part 19 including the connecting terminals 19c.

The feedthrough 28 may electrically connect between the connecting part 19 located inside the laser chamber 10 and the PPM 13 located outside the laser chamber 10 while the inside of the laser chamber 10 is isolated from the outside. The feedthrough 28 may be disposed in the second space 52b of the second container 52. The feedthrough 28 may include a conducting part 281, an insulating part 282, and a coupling part 283.

The conducting part 281 may be a member to electrically connect between the PPM 13 and the connecting part 19. The conducting part 281 may be made of a metallic material such as copper having a low electrical resistance. The conducting part 281 may be formed to extend from its base end corresponding to the inner surface of the bottom part of the connecting plate 19a, toward the output terminal of the PPM 13. The conducting part 281 may be formed to penetrate the wall 52a of the bottom part of the second container 52.

The insulating part 282 may be a member to electrically insulate between the wall 52a of the second container 52 and the conducting part 281. The insulating part 282 may be provided to cover the outer surface of the conducting part 281 except at least the base end surface and the top end surface of the conducting part 281. The insulating part 282 covering the top portion of the conducting part 281 may be formed to protrude outward from the side surface of the top portion of the conducting part 281.

The coupling part 283 may be a member to couple the conducting part 281 covered by the insulating part 282 to the wall 52a of the second container 52. The coupling part 283 may include a flange 283a and a seal member 283b. The flange 283a may be made of a metallic material. The flange 283a may be fixed to the outer surface of the insulating part 282 covering the main body of the conducting part 281. Also, the flange 283a may be fixed to a surface, on the connecting part 19 side, of the protruding portion of the insulating part 282 covering the top portion of the conducting part 281. Here, the conducting part 281 and the insulating part 282 may be blazed or bonded to one another, and also the insulating part 282 and the flange 283a may be blazed or bonded to one another by metal which is not easy to be corroded by fluorine gas, in order to maintain the airtightness. The surface of the flange 283a on the connecting part 19 side may be bonded to the wall 52a of the second container 52 through the seal member 283b. The seal member 283b may be, for example, an O ring.

The charger 12 may be a DC power supply device configured to charge a charging condenser $C_0$ of the PPM 13 at a predetermined voltage. The charger 12 may charge the charging condenser $C_0$ of the PPM 13 at a predetermined voltage, according to the control of the controller 30.

The PPM 13 may apply a pulsed voltage to the main discharge part 11 and the preliminary ionization discharge part 40. The PPM 13 may be connected to the peaking condensers 18, the main discharge part 11, and the preliminary ionization condenser $C_c$ via the feedthrough 28 and the connecting part 19. The PPM 13 may include a switch 13a controlled by the controller 30. When the switch 13a is turned from off to on, the PPM 13 may generate a pulsed voltage from the electric energy stored in the charging condenser $C_0$. The PPM 13 may apply the generated pulsed voltage to the main discharge part 11 and the preliminary ionization discharge part 40. At this time, the PPM 13 may accumulate the electric energy stored in the charging condenser $C_0$ in the peaking condensers 18, and apply the pulsed voltage to the main discharge part 11 and the preliminary ionization discharge part 40 by the discharge from the peaking condensers 18.

The laser resonator may be constituted by a line narrowing module (LNM) 14 and an output coupler (OC) 15. The LNM 14 may include a prism 14a and a grating 14b.

The prism 14a may expand the beam width of the light emitted from the laser chamber 10 via the window 10a. The prism 14a may allow the expanded light to transmit therethrough toward the grating 14b.

The grating 14b may be a wavelength dispersion element having a number of grooves formed in its surface at a predetermined interval. The grating 14b may be provided in a Littrow configuration so that the incident angle is the same as the diffraction angle. The grating 14b may pick out the light at around a specific wavelength, depending on the angle of the diffraction. The light at around the specific wavelength may return from the grating 14b back to the laser chamber 10 via the prism 14a and the window 10a. By this means, it is possible to narrow the spectral width of the light that returns from the grating 14b to the laser chamber 10.

The OC 15 may allow part of the light emitted from the laser chamber 10 via the window 10b to transmit therethrough while reflecting part of the remaining light back to the laser chamber 10. A partial reflection coating may be applied to the surface of the OC 15.

In this way, the OC 15 and the LNM 14 may constitute the laser resonator.

The light emitted from the laser chamber 10 may reciprocate between the LNM 14 and the OC 15. In this case, the light emitted from the laser chamber 10 may be amplified every time the light passes through the discharge space of the main discharge part 11 in the laser chamber 10. Part of the amplified light may transmit through the OC 15. The light having transmitted through the OC may be outputted to the exposure device 110 via the pulse energy measurement unit 17, as a pulsed laser beam.

The pulse energy measurement unit 17 may measure the pulse energy of the pulsed laser beam having transmitted through the OC 15, and output the result of the measurement to the controller 30. The pulse energy measurement unit 17 may include a beam splitter 17a, a collector lens 17b and an optical sensor 17c.

The beam splitter 17a may be provided on the optical path of the pulsed laser beam. The beam splitter 17a may allow the pulsed laser beam having transmitted through the OC 15 to transmit through the beam splitter 17a toward the exposure device 110 with a high transmittance. The beam splitter 17a may reflect part of the pulsed laser beam having transmitted through the OC 15 toward the collector lens 17b. The collector lens 17b may focus the pulsed laser beam reflected from the beam splitter 17a on a light receiving surface of the optical sensor 17c. The optical sensor 17c may detect the pulsed laser beam focused on the light receiving surface. The optical sensor 17c may measure the pulse energy of the detected pulsed laser beam. The optical sensor 17c may output a signal indicative of the measured pulse energy to the controller 30.

The pressure sensor 16 may detect the gas pressure in the laser chamber 10. The pressure sensor 16 may output a detection signal indicative of the detected gas pressure to the controller 30.

The motor 22 may rotate the fan 21. The motor 22 may be a DC motor or an AC motor. The motor 22 may change the number of the rotation of the fan 21 according to the control of the controller 30.

The laser gas supply part 23 may supply the laser gas into the laser chamber 10. The laser gas supply part 23 may include a gas bomb, a valve, and a flow control valve (not shown). The gas bomb may be filled with the laser gas. The valve may block off the flow of the laser gas from the gas bomb to the laser chamber 10. The flow control valve may change the amount of the laser gas being supplied from the gas bomb into the laser chamber 10.

The laser gas supply part 23 may open and close the valve according to the control of the controller 30. The laser gas supply part 23 may change the degree of the opening of the flow control valve according to the control of the controller 30. When the degree of the opening of the flow control valve is changed, the amount of the laser gas being supplied into the laser chamber may be changed. By this means, it is possible to adjust the gas pressure in the laser chamber 10.

The laser gas discharge part 24 may discharge the laser gas in the laser chamber 10 to the outside of the laser chamber 10. The laser gas discharge part 24 may include a valve and an exhaust pump (not shown). The valve may block off the flow of the laser gas from the inside to the outside of the laser chamber 10. The exhaust pump may suck in the laser gas in the laser chamber 10.

The laser gas discharge part 24 may open and close the valve according to the control of the controller 30. The laser gas discharge part 24 may activate the exhaust pump according to the control of the controller 30. When the exhaust pump is activated, the laser gas in the laser chamber 10 may be sucked into the exhaust pump. By this means, it is possible to discharge the laser gas in the laser chamber 10 to the outside of the laser chamber 10, and therefore to reduce the gas pressure in the laser chamber 10.

The controller 30 may send/receive various signals to/from an exposure device controller 111 of the exposure device 110. For example, a signal indicative of a target pulse energy or a target oscillation timing of the pulsed laser beam outputted to the exposure device 110 may be sent from the exposure device controller 111 to the controller 30. The controller 30 may totally control the operation of each component of the gas laser apparatus 1, based on the various signals sent from the exposure device controller 111.

A signal indicative of the pulse energy, which is outputted from the pulse energy measurement unit 17, may be inputted to the controller 30. Based on this signal indicative of the pulse energy and the signal indicative of the target pulse energy sent from the exposure device controller 111, the controller 30 may determine the charging voltage of the charger 12. The controller may output a control signal corresponding to the determined charging voltage to the charger 12. This control signal may be a signal for controlling the operation of the charger 12 to set the determined charging voltage in the charger 12. The controller may determine the timing to apply the pulse voltage to the main discharge part 11, based on the signal indicative of the pulse energy sent from the pulse energy measurement unit 17 and the signal indicative of the target oscillation timing sent from the exposure device controller 111. The controller 30 may output an oscillation trigger signal corresponding to the determined timing to the PPM 13. This oscillation trigger signal may be a control signal for controlling the operation of the PPM 13 to turn the switch 13*a* on or off according to the determined timing.

A detection signal indicative of the gas pressure outputted from the pressure sensor 16 may be inputted to the controller 30. The controller 30 may determine the gas pressure of the laser gas in the laser chamber 10, based on the detection signal indicative of the gas pressure and the charging voltage of the charger 12. The controller 30 may output the control signal corresponding to the determined gas pressure to the laser gas supply part 23 or the laser gas discharge part 24. This control signal may be a signal for controlling the operation of the laser gas supply part 23 or the laser gas discharge part 24 to supply/discharge the laser gas to/from the laser chamber 10, based on the determined gas pressure.

With the above-described configuration, a current path formed by the charger 12, the PPM 13, the feedthrough 28, the connecting part 19, the peaking condensers 18, the main discharge part 11, the preliminary ionization discharge part 40, the plate 25, the wire 27 and the wall 10*c* may constitute a discharge circuit of the gas laser apparatus 1. With the present embodiment, the area of the region enclosed by the loop of the current path constituting the discharge circuit may be referred to as "loop area" of the discharge circuit. As described above, the peaking condensers 18 according to the present embodiment may be disposed in the second space 52*b* inside of the laser chamber 10. If the peaking condensers 18 are disposed in the laser chamber 10, the area of the region enclosed by the current path, that is, the loop area of the discharge circuit of the gas laser apparatus 1 can be reduced. If the loop area of the discharge circuit of the gas laser apparatus 1 is reduced, the inductance of the discharge circuit can be reduced. Therefore, the inductance of the discharge circuit of the gas laser apparatus 1 can be smaller than when the peaking condensers 18 are disposed outside the laser chamber 10. Accordingly, the discharge efficiency of the discharge circuit of the gas laser apparatus 1 can be higher than when the peaking condensers 18 are disposed outside the laser chamber 10. Here, "discharge efficiency" may be a ratio between the energy inputted from an outside power supply device to the gas laser apparatus 1 and the energy released from the gas laser apparatus 1 by the discharge. The detailed circuit configuration of the discharge circuit of the gas laser apparatus 1 will be described later with reference to FIG. 19.

3.2 Operation

The controller 30 may control the laser gas supply part 23 to supply the laser gas into the laser chamber 10. The laser gas may be enclosed in the first space 51*b* and the second space 52*b* constituting the internal space of the laser chamber 10.

Here, as described above, the outer surfaces of the peaking condensers 18 disposed in the second space 52*b* may be coated with a material resistant to the laser gas. As a result, the peaking condensers 18 may not be easy to deteriorate and discharge impurity gas due to the reaction with the laser gas.

The controller 30 may drive the motor 22 to rotate the fan 21. By this means, it is possible to circulate the laser gas in the laser chamber 10. The controller 30 may receive a signal indicative of a target pulse energy Et and a target oscillation timing sent from the exposure device controller 111. The controller 30 may set a charging voltage Vhv corresponding to the target pulse energy Et in the charger 12. The controller 30 may store the value of the charging voltage Vhv set in the charger 12. The controller 30 may operate the switch 13*a* of the PPM 13 in synchronization with the target oscillation timing.

When the switch 13*a* of the PPM 13 is turned from off to on, a voltage may be applied to between the preliminary ionization inner electrode 41 and the preliminary ionization outer electrode 43 of the preliminary ionization discharge part 40. Then, a voltage may be applied to between the first discharge electrode 11*a* and the second discharge electrode 11*b* of the main discharge part 11. By this means, a corona discharge may be generated in the preliminary ionization discharge part 40, so that ultraviolet (UV) light may be generated. When the laser gas in the discharge space of the main discharge part 11 is irradiated with the UV light, the laser gas may be preliminarily ionized. After that, the main discharge may be generated in the discharge space of the main discharge part 11. Here, the discharge direction of the main discharge, that is, the direction in which electrons move, is a direction from the first discharge electrode 11*a* as a cathode electrode to the second discharge electrode 11*b* as an anode electrode. When the main discharge is generated, the laser gas in the discharge space may be excited and emit light.

Here, as described above, by providing the peaking condensers 18 in the laser chamber 10, the loop area of the discharge circuit of the gas laser apparatus 1 may be reduced. Therefore, the inductance of the discharge circuit of the gas laser apparatus 1 may be reduced, so that it is possible to improve the discharge efficiency.

The light emitted from the laser gas may be reflected from the LNM 14 and the OC 15 constituting the laser resonator, and reciprocate in the laser resonator. The spectral width of the light reciprocating in the laser resonator may be narrowed by the LNM 14. The light reciprocating in the laser resonator may be amplified every time the light passes through the discharge space of the main discharge part 11. After that, part of the amplified light may transmit through the OC 15. The light having transmitted through the OC 15 may be outputted to the exposure device 110 as a pulsed laser beam.

Part of the pulsed laser beam having transmitted through the OC 15 may enter the pulse energy measurement unit 17. The pulse energy measurement unit 17 may measure a pulse energy E of the pulsed laser beam having entered the pulse energy measurement unit 17, and output the result of the measurement to the controller 30.

The controller 30 may store the pulse energy E measured by the pulse energy measurement unit 17. The controller 30 may calculate a difference $\Delta E$ between the pulse energy E as a measured value and the target pulse energy Et. The controller 30 may calculate an increase/decrease $\Delta Vhv$ in the charging voltage Vhv which corresponds to the difference $\Delta E$. The controller 30 may add the calculated increase/decrease $\Delta Vhv$ to the charging voltage Vhv stored as described above to calculate the charging voltage Vhv to be newly set. In this way, the controller 30 may perform a feedback control of the charging voltage Vhv.

When the charging voltage Vhv set newly is greater than an allowable maximum value, the controller 30 may control the laser gas supply part 23 to supply the laser gas into the laser chamber until the gas pressure in the laser chamber 10 becomes a predetermined gas pressure. On the other hand, when the charging voltage Vhv set newly is smaller than an allowable minimum value, the controller 30 may control the laser gas discharge part 24 to discharge the laser gas from the laser chamber 10 until the gas pressure in the laser chamber 10 becomes a predetermined gas pressure.

In the laser chamber 10 including the first space 51*b* and the second space 52*b*, the main discharge part 11 and the fan 21 are disposed in the first space 51*b* and the peaking condensers 18 are disposed in the second space 52*b*. By this means, it is possible to reduce the inductance of the discharge circuit. As a result, it is possible to improve the discharge efficiency, that is, the ratio of the discharge energy to the input energy of the laser chamber 10.

3.3 Problem

As described above, the gas laser apparatus 1 according to the present disclosure can improve the discharge efficiency by providing the peaking condensers 18 in the laser chamber 10. However, the gas laser apparatus 1 having this configuration in which the peaking condensers 18 are provided in the laser chamber may have a room for further improvement as follows.

If the peaking condensers 18 are provided in the laser chamber 10 under a high temperature condition, the gas laser apparatus 1 may have a problem that the temperature of the peaking condensers 18 is increased and therefore the performance of the peaking condensers 18 is easy to deteriorate. Particularly, in the gas laser apparatus 1, when the repetition frequency of the gas laser apparatus 1 is increased, an amount of the heat generated by the peaking condensers 18 may be increased. By this means, the performance of the peaking condensers 18 may deteriorate.

Figure 3:
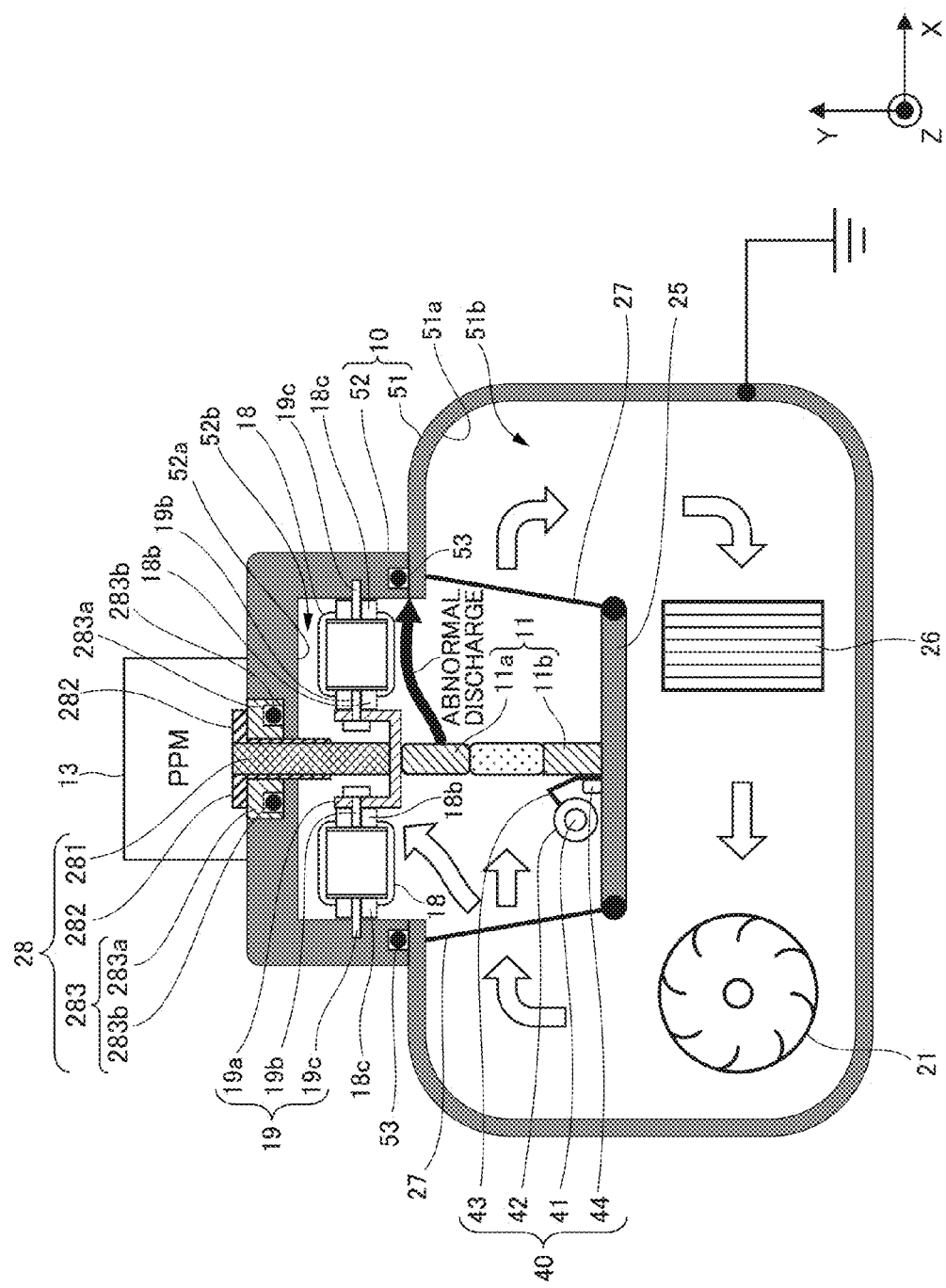
FIG. 3 is a drawing explaining an abnormal discharge which is likely to be generated in the laser chamber shown in FIG. 2 and how to flow laser gas.

Moreover, in the gas laser apparatus 1, when the peaking condensers 18 are provided in the laser chamber 10 in which a main discharge is generated, the peaking condensers 18 may adversely affect the main discharge of the gas laser apparatus 1. Particularly, in the gas laser apparatus 1, when the peaking condensers 18 are disposed near the main discharge part 11, a discharge path may be easy to be formed between the wall 10*c* of the laser chamber 10 and the side surface of the first discharge electrode 11*a* through and along the surfaces of the peaking condensers 18. By this means, the main discharge of the gas laser apparatus 1 may be an abnormal discharge generated from the side surface of the first discharge electrode 11*a* toward the wall 10*c* of the laser chamber 10 through and along the surface of the peaking condenser 18 as shown in FIG. 3.

Moreover, in the gas laser apparatus 1, when the peaking condensers 18 are provided in the laser camber 10 in which the laser gas flows, the flow velocity of the laser gas flowing between the first discharge electrode 11*a* and the second discharge electrode 11*b* may be reduced. In particular, in the gas laser apparatus 1, when the peaking condensers 18 are provided in the second container 52 located near the main discharge part 11, the flow of the laser gas may be hindered by the peaking condensers 18, or a large amount of the laser gas may flow into the second space 52*b* as shown in FIG. 3. Therefore, the placement of the peaking condensers 18 in the second container 52 may cause the flow velocity of the laser gas flowing between the first discharge electrode 11*a* and the second discharge electrode 11*b* to be reduced. In the gas laser apparatus 1, when the flow velocity of the laser gas flowing between the first discharge electrode 11*a* and the second discharge electrode 11*b* is reduced, it may make it difficult to secure a sufficient flow velocity of the laser gas which can move a discharge product generated by a discharge away from the discharge space. As a result, the main discharge of the gas laser apparatus 1 may be an abnormal arc discharge generated from the first discharge electrode 11*a* toward the second discharge electrode 11*b* through the discharge product. Especially, when the repetition frequency is increased, the generation of a discharge product may be increased, so that the arc discharge may be easy to be generated.

Moreover, by coating the surfaces of the peaking condensers 18 provided in the laser chamber 10 with a material resistant to the laser gas, the gas laser apparatus 1 can prevent the deterioration of the peaking condensers 18 and the discharge of impurity gas due to the reaction with the laser gas. However, the gas laser apparatus 1 having this configuration in which the peaking condensers 18 coated with a material resistant to the laser gas are provided in the laser chamber 10 may leave a room for improvement. In particular, when the laser gas contains fluorine, and the surfaces of the peaking condensers 18 are coated with a material resistant to fluorine, the gas laser apparatus 1 including the laser chamber 10 in which the peaking condensers 18 are disposed may leave a room for improvement as follows.

For example, when the material resistant to fluorine coating the surfaces of the peaking condensers 18 is an organic material, it is not possible to completely prevent the reaction between carbon contained in the organic material and fluorine contained in the laser gas, and therefore impurity gas such as $CF_4$ gas may be generated. The impurity gas such as $CF_4$ gas may absorb the laser beam. Therefore, the laser gas may deteriorate due to the discharge of the impurity gas, so that the power of the laser beam outputted from the gas laser apparatus 1 may be reduced. Meanwhile, for example, when the fluorine-resistant material coating the surfaces of the peaking condensers 18 is an inorganic material containing fluoride, it is not possible to completely coat the surfaces of the peaking condensers 18 with the inorganic material, and therefore pinholes may be generated. If there are pinholes in the material coating the peaking condensers 18, the laser gas containing fluorine may enter the peaking condensers 18. This may cause the peaking condensers 18 to react with the laser gas containing fluorine, and therefore to deteriorate.

Therefore, there is a demand for a technology for improving the discharge efficiency of the gas laser apparatus 1 while securing the performance of the peaking condensers 18 disposed in the laser chamber 10. Also there is a demand for a technology for stabilizing the discharge of the gas laser apparatus 1 including the laser chamber 10 in which the peaking condensers 18 are disposed.

4. Laser Chamber Including a Refrigerant Flow Path

Figure 4:
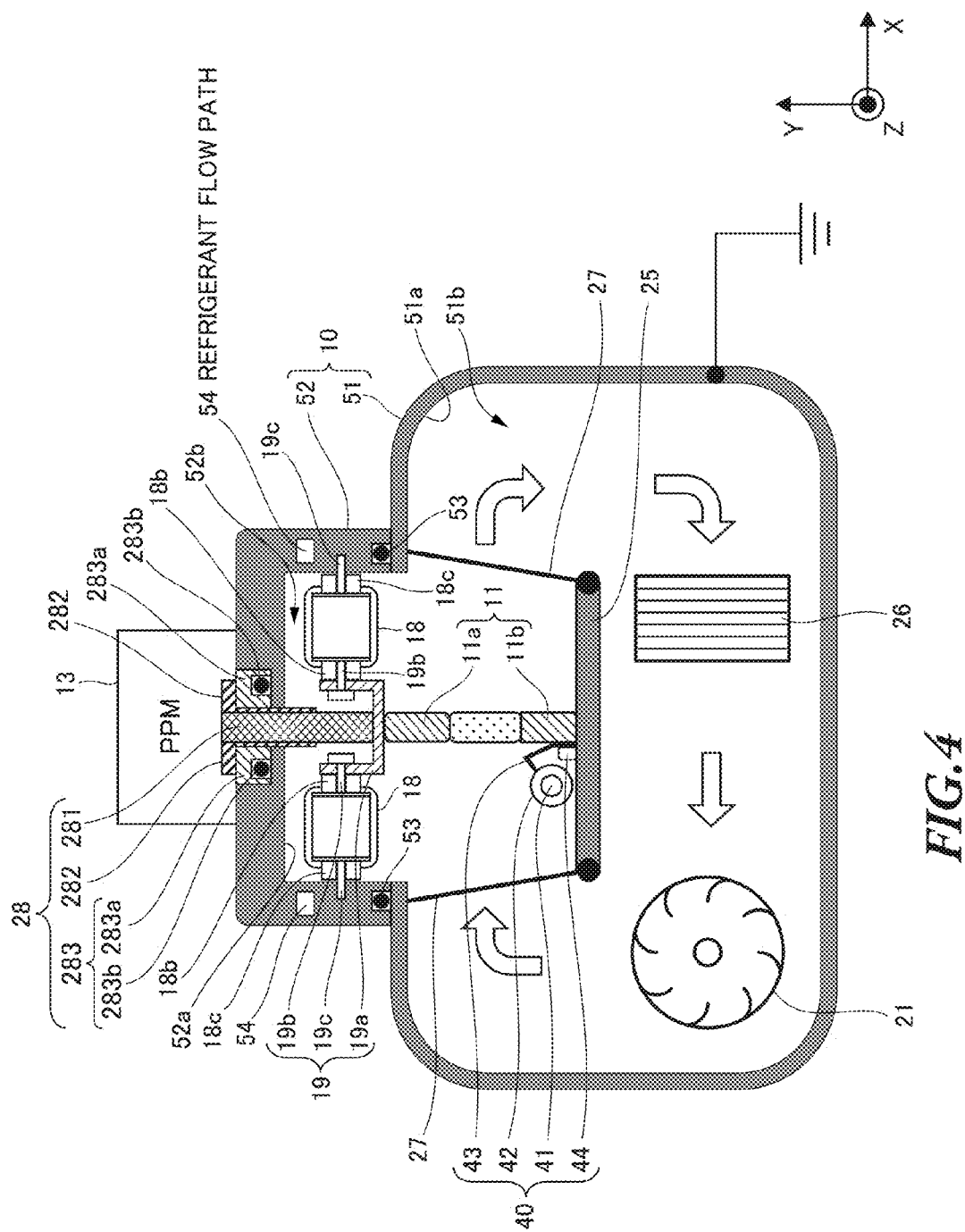
FIG. 4 is a drawing explaining the gas laser apparatus equipped with the laser chamber including a refrigerant flow path.
Figure 5A:
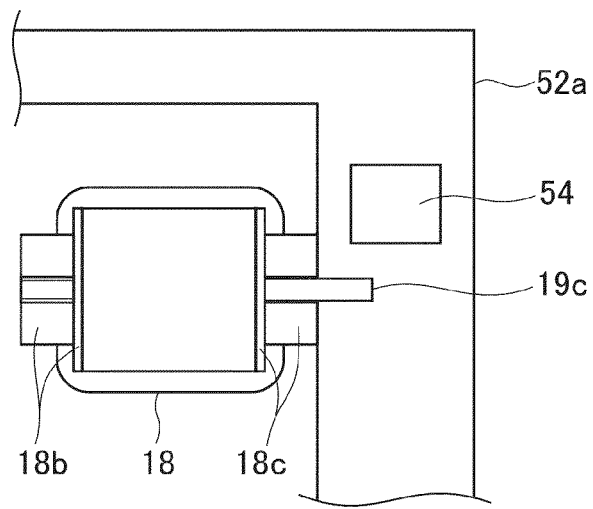
FIG. 5A is a drawing explaining an exemplary cooling structure 1 for cooling a peaking condenser by the refrigerant flow path shown in FIG. 4.
Figure 5B:
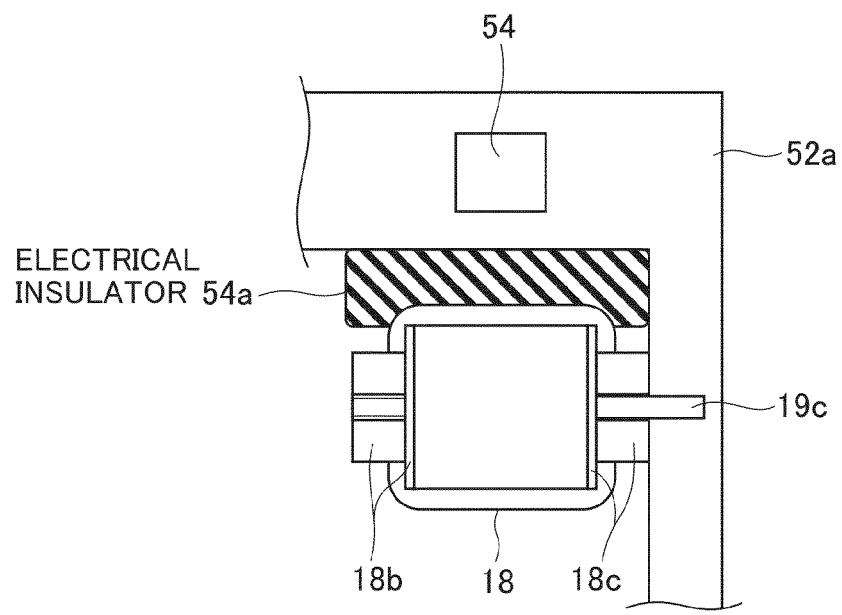
FIG. 5B is a drawing explaining an exemplary cooling structure 2 for cooling the peaking condenser by the refrigerant flow path shown in FIG. 4.

Now, with reference to FIGS. 4 to 5B, the gas laser apparatus 1 equipped with the laser chamber 10 including a refrigerant flow path 54 will be described. FIG. 4 is a drawing explaining the gas laser apparatus 1 equipped with the laser chamber 10 including the refrigerant flow path 54. FIG. 5A is a drawing explaining an exemplary cooling structure 1 for cooling the peaking condenser 18 by the refrigerant flow path 54 shown in FIG. 4. FIG. 5B is a drawing explaining an exemplary cooling structure 2 for cooling the peaking condenser 18 by the refrigerant flow path 54 shown in FIG. 4. The configuration of the gas laser apparatus 1 equipped with the laser chamber 10 shown in FIGS. 4 to 5B, which is the same as that of the gas laser apparatus 1 shown in FIGS. 1 and 2, will not be described again here.

The refrigerant flow path 54 may be a flow path through which a refrigerant flows. The refrigerant flowing through the refrigerant flow path 54 may be cooling water. The refrigerant flow path 54 may be connected to a pump (not shown). The refrigerant flowing through the refrigerant flow path 54 may be circulated by the pump. The refrigerant flow path 54 may be formed in the interior of the wall 10c of the laser chamber 10. The refrigerant flow path 54 may be formed in the interior of the wall 52a of the second container 52.

As shown in FIG. 5A, the refrigerant flow path 54 may be formed in the interior of the wall 52a near a position at which the connecting terminal 19c is connected to the wall 52a. When the peaking condenser 18 generates heat, the heat generated in the peaking condenser 18 may be transferred to the connecting terminal 19c having a high heat conductivity. The heat transferred to the connecting terminal 19c may be transferred to the wall 52a near the position at which the connecting terminal 19c is connected to the wall 52a. The heat transferred to the wall 52a may be transferred to the refrigerant circulating through the refrigerant flow path 54, and discharged to the outside of the second container 52. That is, the heat generated in the peaking condenser 18 may be transferred to the refrigerant circulating through the refrigerant flow path 54, from the electrode 18c of the peaking condenser 18, and discharged to the outside of the laser chamber 10. By this means, in the gas laser apparatus 1, even when the peaking condenser 18 generates heat, it is possible to efficiently cool the peaking condenser 18, and therefore to prevent the deterioration of the performance of the peaking condenser 18.

Meanwhile, as shown in FIG. 5B, the refrigerant flow path 54 may be formed in the interior of the wall 52a in a position near the side surface of the peaking condenser 18 but not in a position near the electrode 18c. In this case, an electrical insulator 54a having a high heat conductivity may be sandwiched between this side surface of the peaking condenser 18 and the wall 52a. The electrical insulator 54a having a high heat conductivity may be, for example, alumina ceramics. When the peaking condenser 18 generates heat, the heat may be transferred to the electrical insulator 54a having a high heat conductivity which is provided between the side surface of the peaking condenser 18 and the wall 52a. The heat transferred to the electrical insulator 54a may be transferred to the wall 52a. The heat transferred to the wall 52a may be transferred to the refrigerant circulating through the refrigerant flow path 54, and discharged to the outside of the second container 52. That is, the heat generated in the peaking condenser 18 may be transferred from the side surface of the peaking condenser 18 not in a position near the electrode 18c to the refrigerant circulating through the refrigerant flow path 54, and then discharged to the outside of the laser chamber 10. By this means, in the gas laser apparatus 1, even though the peaking condenser 18 generates heat, it is possible to efficiently cool the peaking condenser 18, and therefore to prevent the performance of the peaking condenser 18 from deteriorating.

In this way, the gas laser apparatus 1 equipped with the laser chamber 10 shown in FIGS. 4 to 5B can improve the discharge efficiency while securing the performance of the peaking condenser 18. In particular, when a repetition frequency of the discharge is high, an amount of the heat generated by the peaking condensers 18 may be increased depending on the repetition frequency. The gas laser apparatus 1 equipped with the laser chamber 10 shown in FIGS. 4 to 5B can prevent a change in the capacitance of the peaking condensers 18 and the damage of the peaking condensers 18 due to an increase in the temperature of the peaking condensers 18. Therefore, it is possible to stabilize the main discharge of the main discharge part 11, and consequently to stabilize the pulse energy of the outputted laser beam. Here, the other configuration of the gas laser apparatus 1 equipped with the laser chamber 10 shown in FIGS. 4 to 5B may be the same as the configuration of the gas laser apparatus 1 equipped with the laser chamber 10 shown in FIGS. 1 and 2.

5. Laser Chamber Including an Electrical Insulating Member

Figure 6:
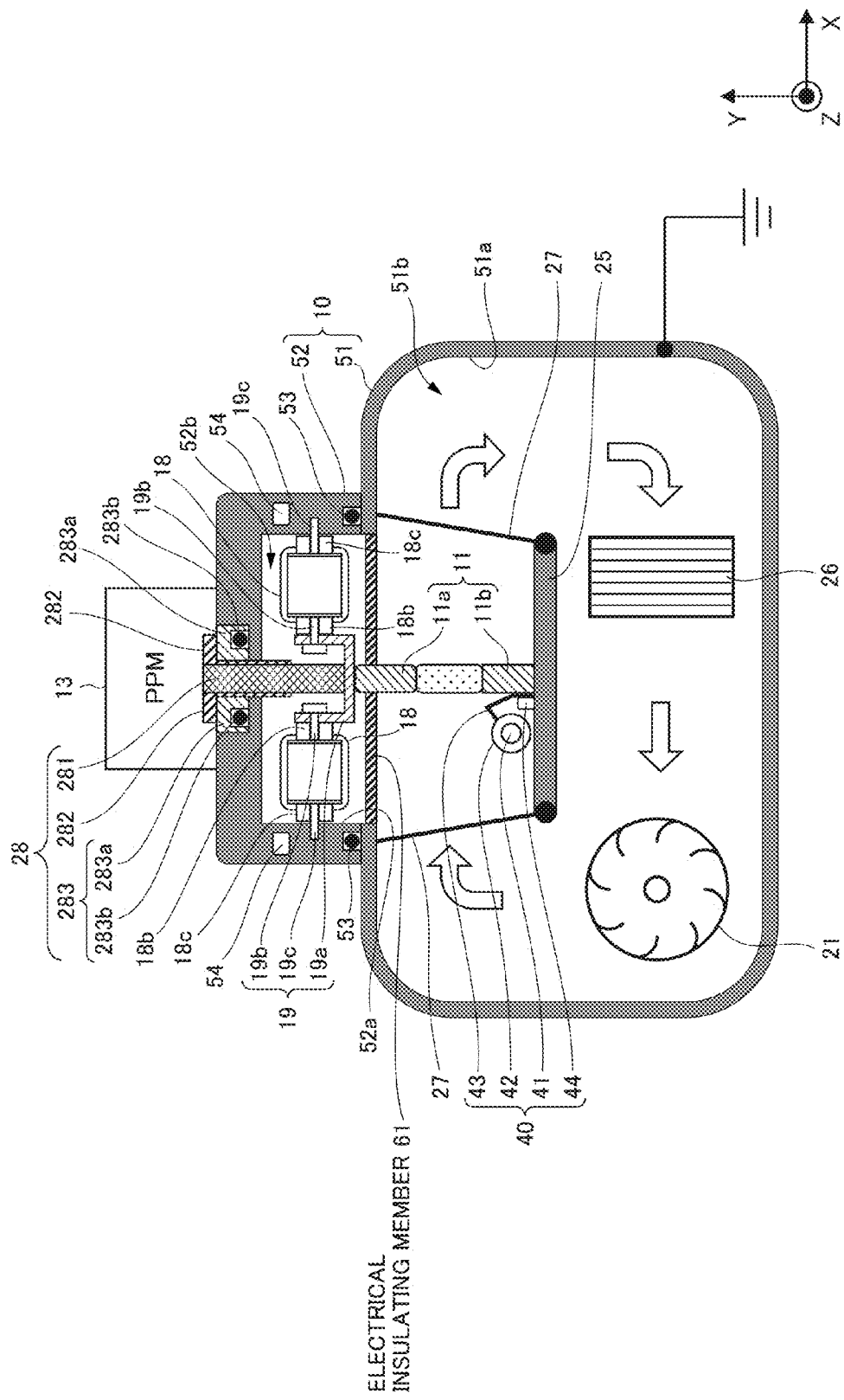
FIG. 6 is a drawing explaining the gas laser apparatus equipped with the laser chamber including an electrical insulating member.

Now, with reference to FIG. 6, the gas laser apparatus 1 equipped with the laser chamber 10 including the electrical insulating member 61 will be described. FIG. 6 is a drawing explaining the gas laser apparatus 1 equipped with the laser chamber 10 including the electrical insulating member 61. The laser chamber 10 shown in FIG. 6 may have a configuration in which the electrical insulating member 61 is added to the laser chamber shown in FIGS. 4 to 5B. The configuration of the gas laser apparatus 1 equipped with the laser chamber 10 shown in FIG. 6, which is the same as that of the gas laser apparatus 1 shown in FIGS. 4 to 5B, will not be described again here.

The electrical insulating member 61 may be a plate to partition the first space 51b and the second space 52b from one another. The electrical insulating member 61 may be formed by using alumina ceramics. The electrical insulating member 61 may be disposed between the first space 51b and the second space 52b. The electrical insulating member 61 may be disposed to allow the laser gas to pass through between the first space 51b and the second place 52b. That is, the electrical insulating member 61 may not seal between the first space 51b and the second space 52b. The electrical insulating member 61 may be disposed to enclose the side surface of the first discharge electrode 11a. The electrical insulating member 61 may be disposed to partition from the side surface of the first discharge electrode 11a and the wall 51a of the first container 51 from one another. The electrical insulating member 61 may be fixed to the wall 51a in a position near the periphery of the opening of the first container 51.

By this means, when the main discharge is generated in the gas laser apparatus 1, the electrical insulating member 61 can prevent a discharge path from being formed between the side surface of the first discharge electrode 11a and the wall 51a of the first container 51, through and along the surfaces of the peaking condensers 18. As a result, the gas laser apparatus 1 can prevent an abnormal discharge generated from the side surface of the first discharge electrode 11a toward the wall 10c of the laser chamber 10, through and along the surfaces of the peaking condensers 18. In addition, the electrical insulating member 61 can prevent the flow of the laser gas from being hindered by the peaking condensers 18, and also prevent a large amount of the laser gas from flowing into the second space 52b. Therefore, the gas laser apparatus 1 can prevent the flow velocity of the laser gas flowing between the first discharge electrode 11a and the second discharge electrode 11b from being reduced. As a result, the gas laser apparatus 1 can secure a sufficient flow rate of the laser gas which can move a discharge product away from the discharge space, and therefore can prevent the abnormal arc discharge generated from the first discharge electrode 11a toward the second discharge electrode 11b through the discharge product.

In addition, the electrical insulating member 61 may be disposed to allow the laser gas to pass through between the first space 51b and the second space 52b. By this means, the electrical insulating member 61 may not be easy to be deformed due to a difference in the pressure between the first space 51b and the second space 52b. In addition, the electrical insulating member 61 is not required to seal between the first space 51b and the second space 52b, and therefore it is possible to reduce the size and thickness of the electrical insulating member 61. As a result, even though the electrical insulating member 61 is small and thin, the gas laser apparatus 1 can consistently prevent the above-described abnormal discharge with a simple configuration.

As described above, the gas laser apparatus 1 equipped with the laser chamber 10 shown in FIG. 6 can improve the discharge efficiency while securing the performance of the peaking condensers 18. In addition, by providing the electrical insulating member 61, the gas laser apparatus 1 can prevent the abnormal arc discharge with a simple configuration, even though the repetition frequency of the discharge is high. As a result, it is possible to stabilize the discharge, and therefore to stabilize the pulse energy of the outputted laser beam. Here, the other configuration of the gas laser apparatus 1 equipped with the laser chamber 10 shown in FIG. 6 may be the same as the configuration of the gas laser apparatus 1 equipped with the laser chamber 10 shown in FIGS. 4 to 5B.

6. Laser Chamber Including a Rectifying Member

Figure 7:
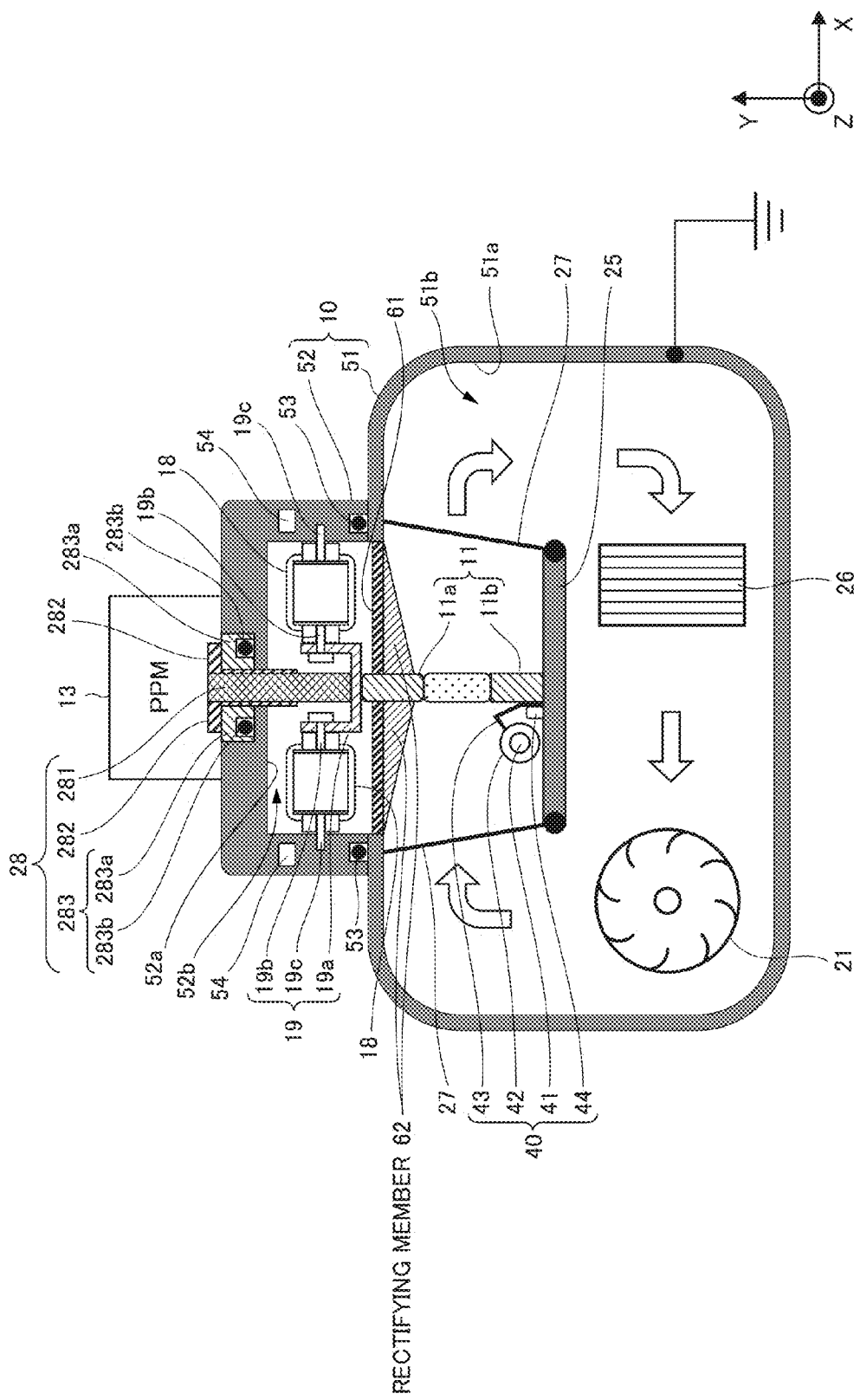
FIG. 7 is a drawing explaining the gas laser apparatus equipped with the laser chamber including a rectifying member.

Now, with reference to FIG. 7, the gas laser apparatus 1 equipped with the laser chamber 10 including a rectifying member 62 will be described. FIG. 7 is a drawing explaining the gas laser apparatus 1 equipped with the laser chamber 10 including the rectifying member 62. The laser chamber 10 shown in FIG. 7 may have a configuration in which the rectifying member 62 is added to the laser chamber 10 shown in FIG. 6. The configuration of the gas laser apparatus 1 equipped with the laser chamber 10 shown in FIG. 7, which is the same as that of the gas laser apparatus 1 shown in FIG. 6, will not be described again here.

The rectifying member 62 may be a member to rectify the flow of laser gas. The rectifying member 62 may be formed by using an electrical insulating material such as alumina ceramics. The rectifying member 62 may be provided to enclose the side surface of the first discharge electrode 11a. The rectifying member 62 may be fixed to the surface of the electrical insulating member 61 in the first space 51b side. The rectifying member 62 may be integrally formed with the electrical insulating member 61. The rectifying member 62 may be disposed upstream and downstream of the flow of the laser gas with respect to the first discharge electrode 11a. Part of the rectifying member 62 located upstream of the flow of the laser gas with respect to the first discharge electrode 11a may have an inclined surface whose thickness is increased from upstream to downstream. The other part of the rectifying member 62 located downstream of the flow of the laser gas with respect to the first discharge electrode 11a may have an inclined surface whose thickness is decreased from upstream to downstream. Here, the thickness of the rectifying member 62 at both side surfaces of the first discharge electrode 11a may be a thickness which causes the rectifying member 62 to be lowered than the discharge surface of the first discharge electrode 11a.

With the above-described configuration, the rectifying member 62 can rectify the direction of the flow of the laser gas, so that the laser gas flows to between the first discharge electrode 11a and the second discharge electrode 11b along the inclined surface. Thus, the flow of the laser gas is rectified by the rectifying member 62, and therefore the laser gas can efficiently flow to between the first discharge electrode 11a and the second discharge electrode 11b. Therefore, the gas laser apparatus 1 can further prevent a reduction in the flow velocity of the laser gas flowing between the first discharge electrode 11a and the second discharge electrode 11b. As a result, the gas laser apparatus 1 can secure a sufficient flow velocity of the laser gas which can move a discharge product away from the discharge space, and therefore can prevent the abnormal arc discharge generated from the first discharge electrode 11a toward the second discharge electrode 11b through the discharge product.

Thus, the gas laser apparatus 1 equipped with the laser chamber 10 shown in FIG. 7 can improve the discharge efficiency while securing the performance of the peaking condensers 18. In addition, by providing the rectifying member 62, the gas laser apparatus 1 can further stabilize the discharge with a simple configuration, even though the repetition frequency of the discharge is high. Here, the other configuration of the gas laser apparatus 1 equipped with the laser chamber 10 shown in FIG. 7 may be the same as the configuration of the gas laser apparatus 1 equipped with the laser chamber 10 shown in FIG. 6.

7. Laser Chamber Including an Insulating Wall Member

Figure 8:
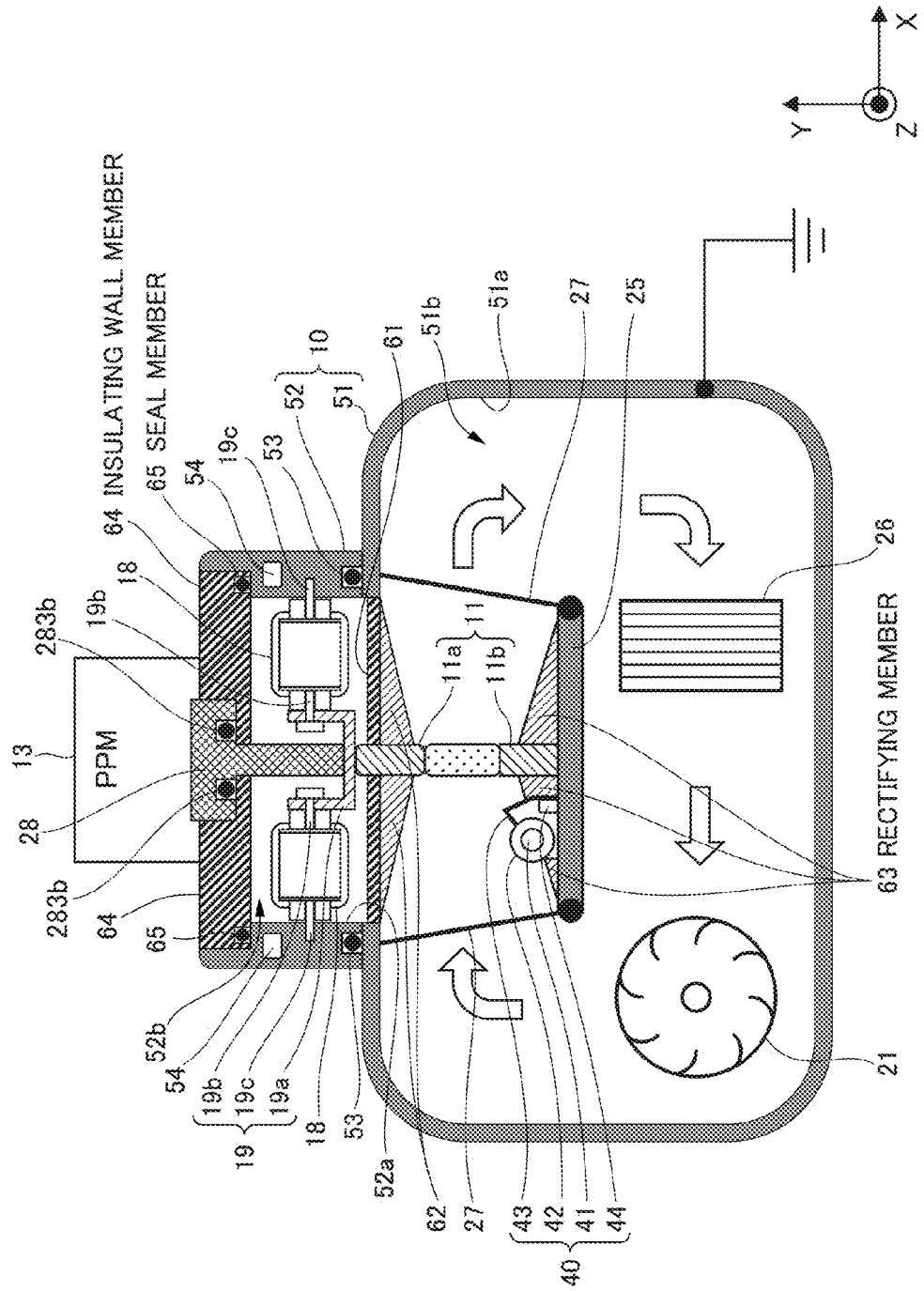
FIG. 8 is a drawing explaining the gas laser apparatus equipped with the laser chamber including an insulating wall member.

Now, with reference to FIG. 8, the gas laser apparatus 1 equipped with the laser chamber 10 including an insulating wall member 64 will be described. FIG. 8 is a drawing explaining the gas laser apparatus 1 equipped with the laser chamber 10 including the insulating wall member 64. The laser chamber 10 shown in FIG. 8 may have a configuration in which a rectifying member 63 and the insulating wall member 64 are added to the laser chamber 10 shown in FIG. 7. The configuration of the gas laser apparatus 1 equipped with the laser chamber 10 shown in FIG. 8, which is the same as that of the gas laser apparatus 1 shown in FIG. 7, will not be described again here.

The rectifying member 63 may be a member to rectify the flow of laser gas. The rectifying member 63 may be formed by using an electrical insulating material such as alumina ceramics. Alternatively, the rectifying member 63 may be formed by using a metallic material such as nickel metal. The rectifying member 63 may have a porous structure to absorb acoustic waves generated by the main discharge. The rectifying member 63 may be provided to enclose the side surfaces of the second discharge electrode 11b and the preliminary ionization discharge part 40. The rectifying member 63 may be fixed to the plate 25. The rectifying member 63 may be disposed upstream and downstream of the flow of the laser gas with respect to the second discharge electrode 11b. Part of the rectifying member 63 located upstream of the flow of the laser gas with respect to the second discharge electrode 11b may have an inclined surface whose thickness is increased from upstream to downstream. The other part of the rectifying member 63 located downstream of the flow of the laser gas with respect to the second discharge electrode 11b may have an inclined surface whose thickness is decreased from the upstream to downstream. Here, the thickness of the rectifying member 63 at both side surfaces of the second discharge electrode 11b may be a thickness which causes the rectifying member 63 to be lowered than the discharge surface of the second discharge electrode 11b.

The insulating wall member 64 may be a member which substitutes for the wall 52a of the bottom part of the second container 52. The insulating wall member 64 may be formed by using an electrical insulating material such as alumina ceramics. The feedthrough 28 may penetrate the center of the insulating wall member 64. Here, the feedthrough 28 of the laser chamber 10 including the insulating wall member 64 may not include the conducting part 281, the insulating part 282, and the coupling part 283 as shown in FIGS. 2 to 7. That is, the feedthrough 28 of the laser chamber 10 including the insulating wall member 64 may be a conducting member made of metal, for example copper, and having a flange as shown in FIG. 8.

The periphery of the insulating wall member 64 may be bonded to the wall 52a of the side surface of the second container 52 through a seal member 65. The seal member 65 may be, for example, an O ring. The insulating wall member 64 may insulate the second space 52b of the second container 52 from the outside. The insulating wall member 64 may be disposed to partition the output terminal of the PPM 13 and the feedthrough 28 from the wall 52a of the side surface of the second container 52.

With the above-described configuration, the rectifying member 63 can rectify the direction of the flow of the laser gas, so that the laser gas flows to between the first discharge electrode 11a and the second discharge electrode 11b along the inclined surface. Thus, the flow of the laser gas is rectified by the rectifying member 63, and therefore the laser gas can efficiently flow to between the first discharge electrode 11a and the second discharge electrode 11b. Therefore, the gas laser apparatus 1 can further prevent a reduction in the flow velocity of the laser gas flowing between the first discharge electrode 11a and the second discharge electrode 11b. As a result, the gas laser apparatus 1 can further secure a sufficient flow velocity of the laser gas which can move a discharge product away from the discharge space, and therefore can further prevent the abnormal arc discharge generated from the first discharge electrode 11a toward the second discharge electrode 11b through the discharge product.

In addition, the insulating wall member 64 can prevent a discharge path from being formed between the feedthrough 28 connected to the output terminal of the PPM 13 and the wall 52a of the second container 52. Moreover, the insulating wall member 64 can prevent a discharge path from being formed between the peaking condensers 18 and the wall 52a of the second container 52. As a result, the gas laser apparatus 1 can prevent the abnormal discharge from the feedthrough 28 connected to the output terminal of the PPM 13, toward the wall 52a of the second container 52. Moreover, the gas laser apparatus 1 can prevent the abnormal discharge from the peaking condensers 18 toward the wall 52a of the second container 52.

Thus, the gas laser apparatus 1 equipped with the laser chamber 10 shown in FIG. 8 can improve the discharge efficiency while securing the performance of the peaking condensers 18. In addition, by providing the insulating wall member 64, the gas laser apparatus 1 can prevent the abnormal discharge from the feedthrough 28 toward the wall 52a of the second container 52 even through the insulating part 282 is not provided on the feedthrough 28. In addition, by providing the rectifying member 63, the gas laser apparatus 1 can further improve the flow velocity of the laser gas flowing in the discharge space of the main discharge part 11. As a result, the gas laser apparatus 1 equipped with the laser chamber 10 shown in FIG. 8 can further stabilize the discharge with a simple configuration, even when the repetition frequency of the discharge is high. Here, the other configuration of the gas laser apparatus 1 equipped with the laser chamber 10 shown in FIG. 8 may be the same as that of the gas laser apparatus 1 equipped with the laser chamber 10 shown in FIG. 7.

Figure 9:
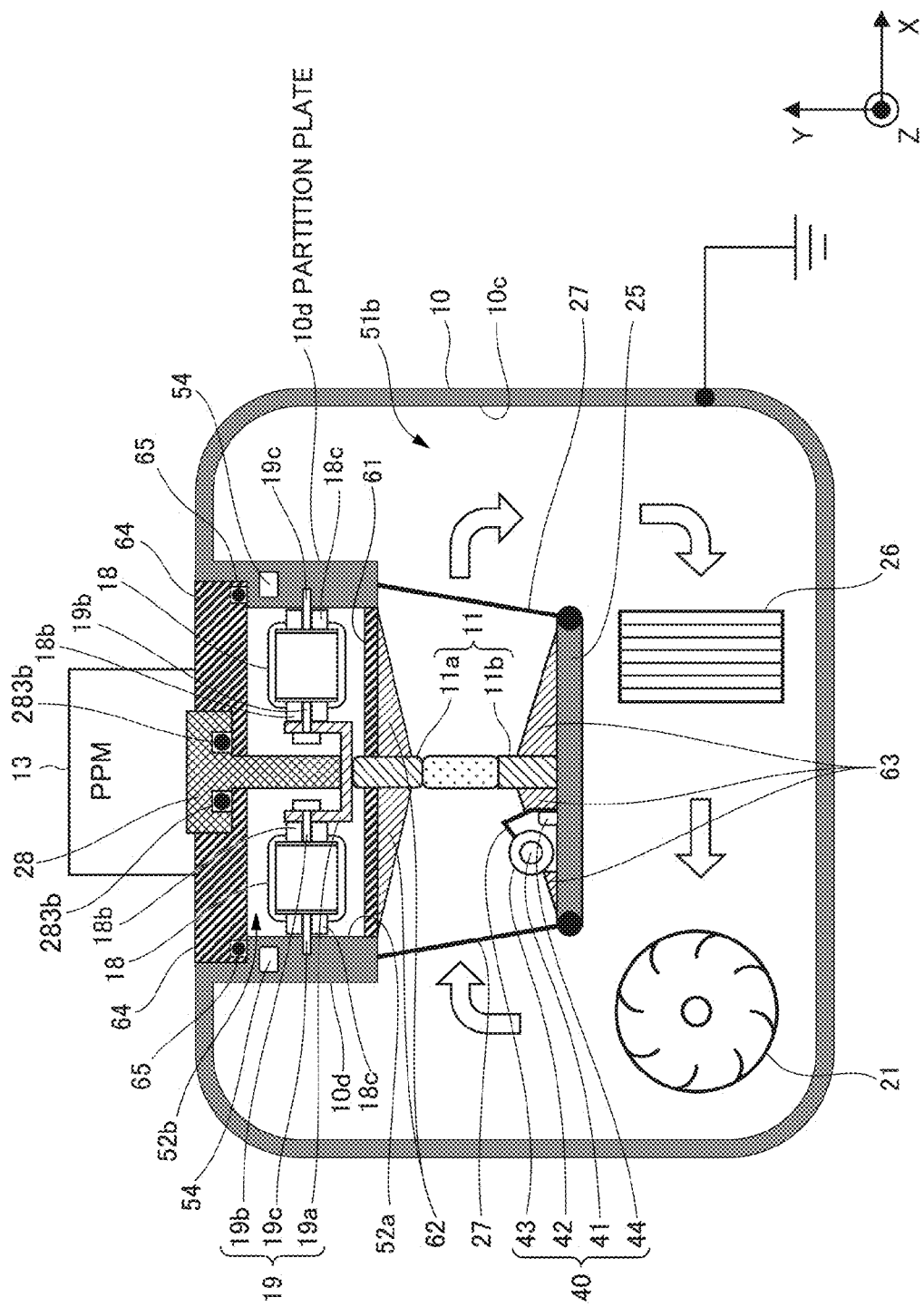
FIG. 9 is a drawing explaining the gas laser apparatus equipped with the laser chamber formed by integrating a first container and a second container.

8. Laser Chamber Formed by Integrating the First Container and the Second Container Now, with reference to FIG. 9, the gas laser apparatus 1 equipped with the laser chamber 10 formed by integrating the first container 51 and the second container 52 will be described. FIG. 9 is a drawing explaining the gas laser apparatus 1 equipped with the laser chamber 10 formed by integrating the first container 51 and the second container 52. The configuration of the laser chamber 10 formed by integrating the first container 51 and the second container 52 may be a configuration in which the first container 51 and the second container 52 of the laser chamber 10 shown in any of FIGS. 2 to 4 and 6 to 8 are integrally formed. The configuration of the gas laser apparatus 1 equipped with the laser chamber 10 shown in FIG. 9, which is the same as that of the gas laser apparatus 1 shown in FIG. 8, will not be described again here.

The laser chamber 10 shown in FIG. 9 may be formed by integrating the first container 51 and the second container 52 shown in FIG. 8 as a single container. The wall 52a of the bottom part of the second container 52 and the wall 51a of the periphery of the opening of the first container 51 shown in FIG. 8 may be integrated with one another, as part of the one-piece wall 10c of the laser chamber 10 shown in FIG. 9. Then, in the laser chamber shown in FIG. 9, a partition plate 10d may substitute for the wall 52a of the side surface of the second container 52 shown in FIG. 8.

The partition plate 10d may be a metallic plate to partition the internal space of the laser chamber 10 into the first space 51b and the second space 52b. The partition plate 10d may be part of the wall 10c of the laser chamber 10. The connecting terminals 19c connected to the electrodes 18c of the peaking condensers 18 may be connected to the partition plate 10d. The wire 27 may be connected to the partition plate 10d. The electrical insulating member 61 may be fixed to the top end part of the partition plate 10d. The refrigerant flow path 54 may be formed in the interior of the partition plate 10d.

With the above-described configuration, the laser chamber shown in FIG. 9 may include the first space 51b in which at least the main discharge part 11 is disposed and the second space 52b in which at least the peaking condensers 18 are disposed. In addition, the laser chamber 10 shown in FIG. 9 may not need the seal member 53. The gas laser apparatus 1 equipped with the laser chamber 10 shown in FIG. 9 can improve the discharge efficiency, secure the performance of the peaking condensers 18, and improve the stability of the discharge all together, in the same way as the gas laser apparatus 1 shown in FIG. 8. Here, the other configuration of the gas laser apparatus 1 equipped with the laser chamber 10 shown in FIG. 9 may be the same as the configuration of the gas laser apparatus 1 equipped with the laser chamber 10 shown in FIG. 8.

9. Peaking Condenser

Figure 10A:
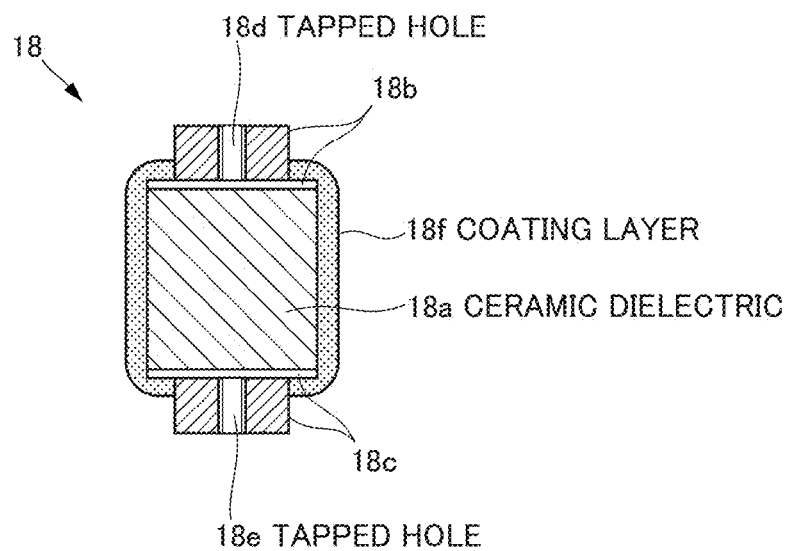
FIG. 10A is a drawing explaining a configuration example 1 of the peaking condenser.
Figure 10B:
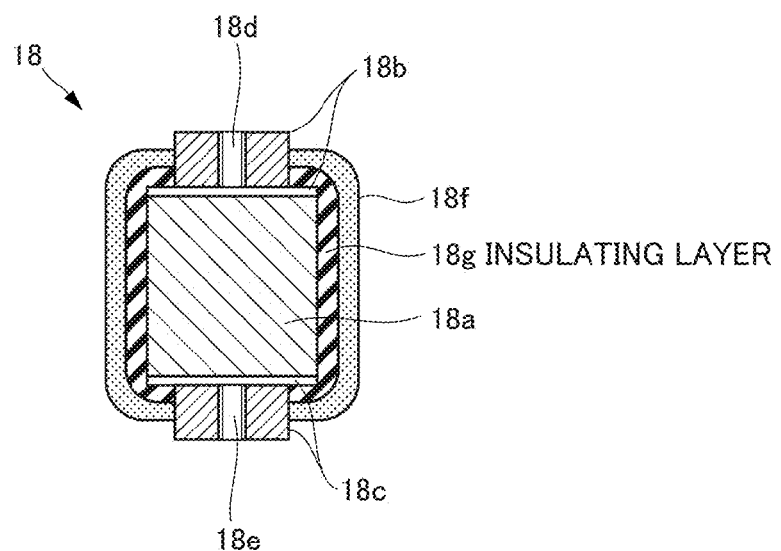
FIG. 10B is a drawing explaining a configuration example 2 of the peaking condenser.

Now, with reference to FIGS. 10 to 15B, the detailed configuration of the peaking condenser 18 will be described. FIG. 10A is a drawing explaining a configuration example 1 of the peaking condenser 18. FIG. 10B is a drawing explaining a configuration example 2 of the peaking condenser 18. The configuration of the peaking condenser 18 shown in FIGS. 10A and 10B, which is the same as that of the peaking condenser 18 shown in FIGS. 1 to 9, will not be described again here.

As shown in FIG. 10A, the peaking condenser 18 may include a ceramic dielectric 18a, the electrode 18b, the electrode 18c, a tapped hole 18d, a tapped hole 18e, and a coating layer 18f. The ceramic dielectric 18a may be formed by using strontium titanate. The electrodes 18b and 18c may be formed by using brass. The tapped hole 18d may be formed as a female thread to connect the connecting terminal 19b of the connecting part 19 to the electrode 18b. Meanwhile, the tapped hole 18e may be formed as a female thread to connect the connecting terminal 19c of the connecting part 19 to the electrode 18c.

The coating layer 18f may be an inorganic layer formed on the outer surface of the peaking condenser 18 by using a material resistant to the laser gas. The material for forming the coating layer 18f may be any of, for example, alumina, calcium fluoride, and yttrium oxide. The coating layer 18f may be formed by coating the outer surface of the ceramic dielectric 18a with the above-described material by thermal spray.

In addition, as shown in FIG. 10B, the peaking condenser 18 may include an insulating layer 18g formed between the ceramic dielectric 18a and the coating layer 18f shown in FIG. 10A. The insulating layer 18g may be formed by using, for example, epoxy resin. The coating layer 18f shown in FIG. 10B may be formed by coating the outer surface of the insulating layer 18g with the above-described material such as alumina by thermal spray.

Even when either the configuration example 1 of the peaking condenser 18 shown in FIG. 10A or the configuration example 2 of the peaking condenser 18 shown in FIG. 10B is adopted in the gas laser apparatus 1, it is possible to prevent the peaking condenser 18 from being easy to deteriorate and discharge the impurity gas due to the reaction with the laser gas. In particular, the coating layer 18f coated by thermal spray may be a thick coating layer with few pinholes. Therefore, the coating layer 18f coated by thermal spray can prevent the laser gas from entering the peaking condenser 18.

Moreover, when the configuration example 1 of the peaking condenser 18 shown in FIG. 10A is adopted in the gas laser apparatus 1, there may be no need to use the epoxy resin, which is weak against heat, for the peaking condenser 18. Therefore, it is possible to improve the heat resistance of the peaking condenser 18. As a result, the gas laser apparatus 1 can simplify the structure for cooling the peaking condensers 18, such as the refrigerant flow path 54. Moreover, when the configuration example 2 of the peaking condenser 18 shown in FIG. 10B is adopted in the gas laser apparatus 1, a creeping discharge may hardly be generated between the electrodes 18b and 18c of the peaking condenser 18. Therefore, it is possible to further stabilize the discharge of the gas laser apparatus 1. Here, the other configuration of the peaking condenser 18 shown in FIGS. 10A and 10B may be the same as the configuration of the peaking condenser 18 shown in FIGS. 1 to 9.

Figure 11:
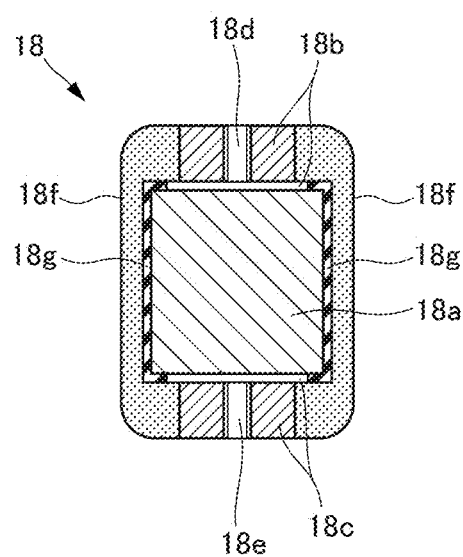
FIG. 11 is a drawing explaining a configuration example 3 of the peaking condenser.

Now, with reference to FIG. 11, a configuration example 3 of the peaking condenser 18 will be described. FIG. 11 is a drawing explaining the configuration example 3 of the peaking condenser 18. The peaking condenser 18 shown in FIG. 11 may have the coating layer 18f whose configuration is different from that of the coating layer 18f of the peaking condenser 18 shown in FIGS. 10A and 10B. In addition, the peaking condenser 18 shown in FIG. 11 may have the insulating layer 18g whose configuration is different from that of the insulating layer 18g of the peaking condenser 18 shown in FIG. 10B. The configuration of the peaking condenser shown in FIG. 11, which is the same as that of the peaking condenser 18 shown in FIGS. 10A and 10B, will not be described again here.

As described above, the coating layer 18f of the configuration example 1 of the peaking condenser 18 shown in FIG. 10A may be formed on the outer surface of the ceramic dielectric 18a. The coating layer 18f of the configuration example 2 of the peaking condenser 18 shown in FIG. 10B may be formed on the outer surface of the insulating layer 18g formed on the ceramic dielectric 18a. Moreover, the insulating layer 18g of the configuration example 2 of the peaking condenser 18 shown in FIG. 10B may be formed by molding epoxy resin on the ceramic dielectric 18a.

In contrast, the coating layer 18f of the configuration example 3 of the peaking condenser 18 shown in FIG. 11 may be formed not only on the outer surface of the ceramic dielectric 18a or the insulating layer 18g, but also on the outer surfaces of the electrodes 18b and 18c. In addition, the insulating layer 18g of the configuration example 3 of the peaking condenser 18 shown in FIG. 11 may be formed by coating the ceramic dielectric 18a with epoxy-polyamide resin to form a thin film of the resin. The coating layer 18f shown in FIG. 11 may be formed by applying the above-described material such as alumina to the insulating layer 18g coating the ceramic dielectric 18a, and the outer surfaces of the electrodes 18b and 18c by thermal spray. By this means, the configuration example 3 of the peaking condenser 18 can more effectively prevent the creeping discharge from being generated between the electrodes 18b and 18c than the configuration examples 1 and 2 of the peaking condenser 18. Therefore, the gas laser apparatus 1 adopting the configuration example 3 of the peaking condenser 18 can stabilize the discharge more than the case where the configuration example 1 or 2 of the peaking condenser 18 is adopted. Here, the other configuration of the peaking condenser 18 shown in FIG. 11 may be the same as that of the peaking condenser 18 shown in FIGS. 10A and 10B.

Figure 12:
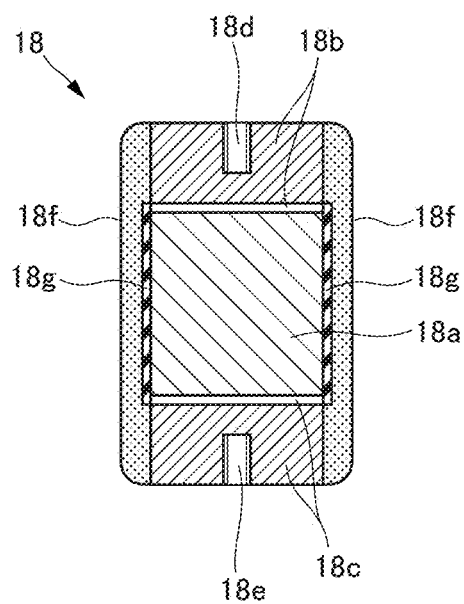
FIG. 12 is a drawing explaining a configuration example 4 of the peaking condenser.

Now, with reference to FIGS. 12 to 14B, a configuration example 4 of the peaking condenser 18 will be described. FIG. 12 is a drawing explaining the configuration example 4 of the peaking condenser 18. The configuration of the electrodes 18b and 18c of the peaking condenser 18 shown in FIG. 12 may be different from that of the peaking condenser 18 shown in FIG. 11. The configuration of the peaking condenser 18 shown in FIG. 12, which is the same as that of the configuration example 3 of the peaking condenser 18 shown in FIG. 11, will not be described again here.

The outer diameter of each of the electrodes 18b and 18c of the configuration example 3 of the peaking condenser 18 shown in FIG. 11 may be smaller than the outer diameter of the ceramic dielectric 18a. That is, in the configuration example 3 of the peaking condenser 18, the outer peripheries of the electrodes 18b and 18c may be connected to the outer periphery of the ceramic dielectric 18a with a difference in level in the direction of the central axis of the peaking condenser 18.

In contrast, in the configuration example 4 of the peaking condenser 18 shown in FIG. 12, the outer diameter of each of the electrodes 18b and 18c may be approximately the same as the outer diameter of the ceramic dielectric 18a. That is, in the configuration example 4 of the peaking condenser 18, the outer peripheries of the electrodes 18b and 18c may be smoothly connected to the outer periphery of the ceramic dielectric 18a without a difference in level in the direction of the central axis of the peaking condenser 18.

Figure 13A:
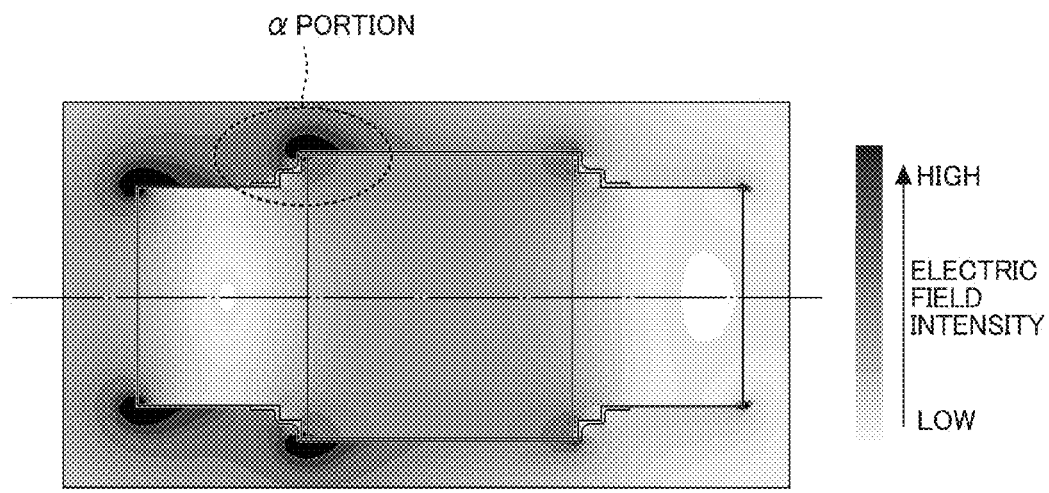
FIG. 13A is a drawing explaining a simulation result of electric field intensity distribution of the configuration example 3 of the peaking condenser shown in FIG. 11.
Figure 13B:
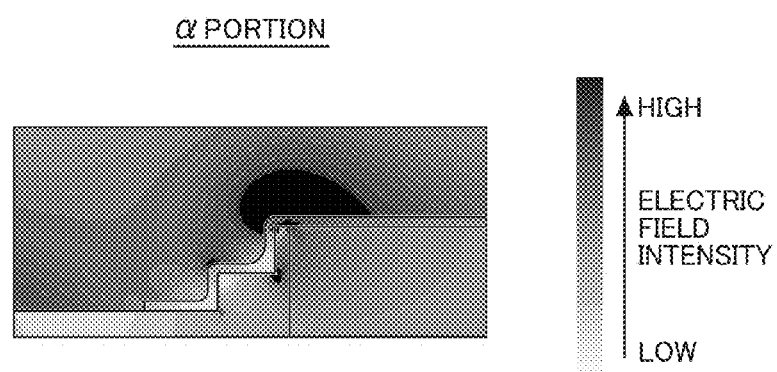
FIG. 13B is an enlarged view of an a portion shown in FIG. 13A.
Figure 14A:
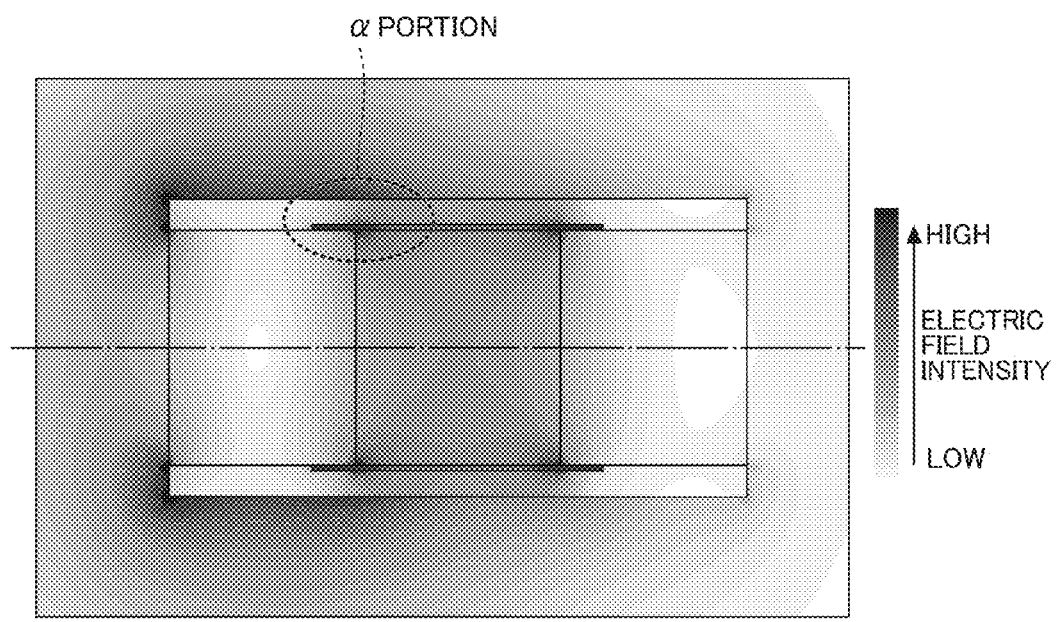
FIG. 14A is a drawing explaining a simulation result of electric field intensity distribution of the configuration example 4 of the peaking condenser shown in FIG. 12.
Figure 14B:
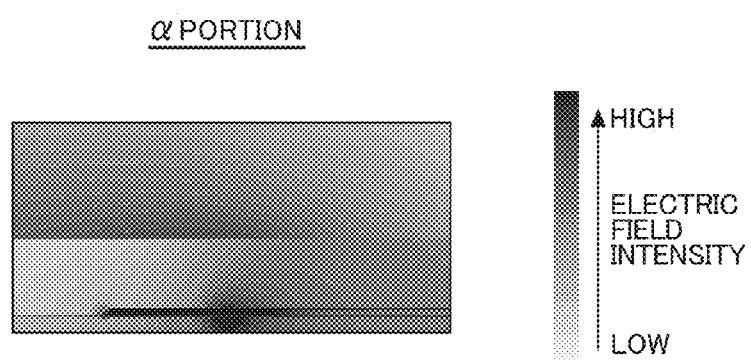
FIG. 14B is an enlarged view of an a portion shown in FIG. 14A.

FIG. 13A is a drawing explaining a simulation result of electric field intensity distribution of the configuration example 3 of the peaking condenser 18 shown in FIG. 11. FIG. 13B is an enlarged view of an a portion shown in FIG. 13A. FIG. 14A is a drawing explaining a simulation result of electric field intensity distribution of the configuration example 4 of the peaking condenser 18 shown in FIG. 12. FIG. 14B is an enlarged view of an a portion shown in FIG. 14A.

As shown in FIGS. 13A and 13B, in the configuration example 3 of the peaking condenser 18, it can be seen that the intensity of the electric field is increased locally at connection portions at which the outer peripheries of the electrodes 18b and 18c are connected to the outer periphery of the ceramic dielectric 18a. In contrast, as shown in FIGS. 14A and 14B, it can be seen that the intensity of the electric field is reduced at the connection portions at which the outer peripheries of the electrodes 18b and 18c are connected to the outer periphery of the ceramic dielectric 18a, and that the electric field is suppressed from concentrating at the connection portions. In this way, in the configuration example 4 of the peaking condenser 18, the connection portions at which the outer peripheries of the electrodes 18b and 18c are connected to the outer periphery of the ceramic dielectric 18a are smooth and have no difference in level. Therefore, it is possible to suppress the electric field from concentrating at the connection portions.

Moreover, the simulation result of the configuration example 4 of the peaking condenser 18 shown in FIGS. 14A and 14B demonstrates that the maximum electric field intensity of the configuration example 4 of the peaking condenser 18 was equal to or lower than half of the maximum electric field intensity of the configuration example 3 of the peaking condenser 18 shown in FIGS. 13A and 13B. Thus, the configuration example 4 of the peaking condenser 18 has the structure in which the connection portions at which the outer peripheries of the electrodes 18b and 18c are connected to the outer periphery of the ceramic dielectric 18a are smooth and have no difference in level. Therefore, it is possible to significantly reduce an absolute value of the electric field intensity of the peaking condenser 18.

Accordingly, the configuration example 4 of the peaking condenser 18 can significantly improve the performance on the dielectric strength voltage as compared to the configuration example 3 of the peaking condenser 18. Therefore, the discharge of the gas laser apparatus 1 adopting the configuration example 4 of the peaking condenser 18 can be more stabilized than the configuration example 3 of the peaking condenser 18. Here, the other configuration of the peaking condenser 18 shown in FIG. 12 may be the same as the configuration of the peaking condenser 18 shown in FIG. 11.

Figure 15A:
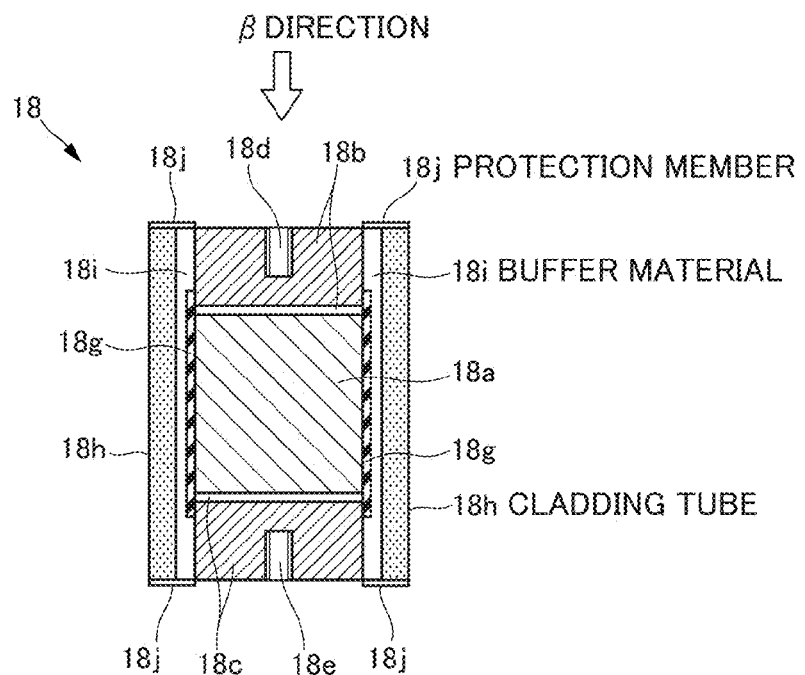
FIG. 15A is a drawing explaining a configuration example of the peaking condenser.
Figure 15B:
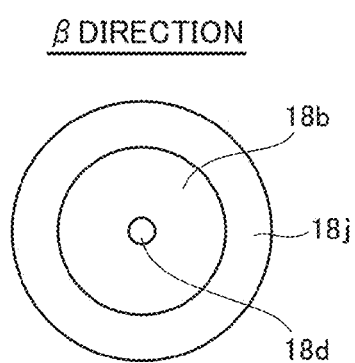
FIG. 15B is a drawing showing the configuration example 5 of the peaking condenser shown in FIG. 15A, as viewed from a direction.

Now, with reference to FIGS. 15A and 15B, a configuration example 5 of the peaking condenser 18 will be described. FIG. 15A is a drawing explaining the configuration example 5 of the peaking condenser 18. FIG. 15B is a drawing showing the configuration example 5 of the peaking condenser 18 shown in 15A, as viewed from a R direction. The configuration of the peaking condenser 18 shown in FIGS. 15A and 15B, which is the same as that of the configuration example 4 of the peaking condenser 18 shown in FIG. 12, will not be described again here.

As shown in FIG. 15A, the peaking condenser 18 may include the ceramic dielectric 18a, the electrode 18b, the electrode 18c, the tapped hole 18d, the tapped hole 18e, the insulating layer 18g, a cladding tube 18h, a buffer material 18i, and protection members 18j. That is, the peaking condenser 18 shown in FIG. 15A may include the cladding tube 18h and the protection members 18j, instead of the coating layer 18f. Moreover, the peaking condenser 18 shown in FIG. 15A may include the buffer material 18i.

The cladding tube 18h may be a tube to cover the ceramic dielectric 18a and the electrodes 18b and 18c. The cladding tube 18h may be formed by using an insulating material resistant to the laser gas. The material for forming the cladding tube 18h may be any of, for example, alumina, calcium fluoride, yttrium oxide, and sapphire. Preferably, the cladding tube 18h may be formed by an alumina ceramic tube or a sapphire tube containing few impurities. The cladding tube 18h may be formed into an approximately cylindrical hollow shape. The length of the cladding tube 18h in the direction of the central axis may be approximately the same as the distance from the end face of the electrode 18b on which the tapped hole 18d is open to the end face of the electrode 18c on which the tapped hole 18e is open. The inside diameter of the cladding tube 18h may be greater than the outside diameter of the insulating layer 18g coating the ceramic dielectric 18a and the outside diameter of each of the electrodes 18b and 18c. The inside diameter of the cladding tube 18h may be enough to allow the ceramic dielectric 18a coated with the insulating layer 18g and the electrodes 18b and 18c to be inserted into the cladding tube 18h without contacting the inner surface of the cladding tube 18h. Moreover, the inside diameter of the cladding tube 18h may be enough to allow the ceramic dielectric 18a coated with the insulating layer 18g and the electrodes 18b and 18c not to contact the cladding tube 18h.

The buffer material 18i may fill a gap between the inner surface of the cladding tube 18h and the outer surfaces of the insulating layer 18g coating the ceramic dielectric 18a and the electrodes 18b and 18c. The buffer material 18i may be formed by using an insulating material having elasticity and adhesion such as silicone resin. The buffer material 18i may be deformed according to the thermal expansion of the ceramic dielectric 18a and the electrodes 18b and 18c. By this means, the buffer material 18i can relax the thermal stress generated in the ceramic dielectric 18a and the electrodes 18b and 18c, due to the thermal expansion of the ceramic dielectric 18a and the electrodes 18b and 18c which are inserted in the cladding tube 18h.

The protection members 18j may be formed to cover the end faces of the buffer material 18i and the end faces of the cladding tube 18h. The protection members 18j may be formed by applying the above-described insulating material resistant to the laser gas, such as alumina, to the end faces of the buffer material 18i and the end faces of the cladding tube 18h by thermal spray. The material for forming the protection members 18j may be any of, for example, alumina, calcium fluoride, and yttrium oxide. By this means, the protection member 18j can protect the end faces of the buffer material 18i from being exposed to the laser gas, and therefore to prevent the laser gas from entering the peaking condenser 18.

With the configuration described above, the configuration example 5 of the peaking condenser 18 can provide high performance on the dielectric strength voltage, in the same way as the configuration example 4 of the peaking condenser 18. Therefore, the discharge of the gas laser apparatus 1 adopting the configuration example 5 of the peaking condenser 18 can be stabilized in the same way as the gas laser apparatus 1 adopting the configuration example 4 of the peaking condenser 18. In addition, by using the cladding tube 18h and the protection members 18j instead of the coating layer 18f, the configuration example 5 of the peaking condenser 18 can more effectively prevent the laser gas from entering the peaking condenser 18 than the configuration example 4 of the peaking condenser 18. Therefore, the configuration example 5 of the peaking condenser 18 may not be easy to react with the laser gas and therefore to deteriorate as compared to the configuration example 4 of the peaking condenser 18. Moreover, by using the cladding tube 18h and the protection members 18j instead of the coating layer 18f, the configuration example 5 of the peaking condenser 18 can significantly reduce the area subjected to thermal spray with the above-described insulating material resistant to the laser gas, such as alumina. Therefore, the configuration example 5 of the peaking condenser 18 can reduce the number of manufacturing steps and also simplify the manufacturing process, as compared to the configuration example 4 of the peaking condenser 18. Here, the other configuration of the peaking condenser 18 shown in FIGS. 15A and 15B may be the same as the configuration of the peaking condenser 18 shown in FIG. 12.

10. Electrical Insulating Member

10.1 Configuration

Figure 16:
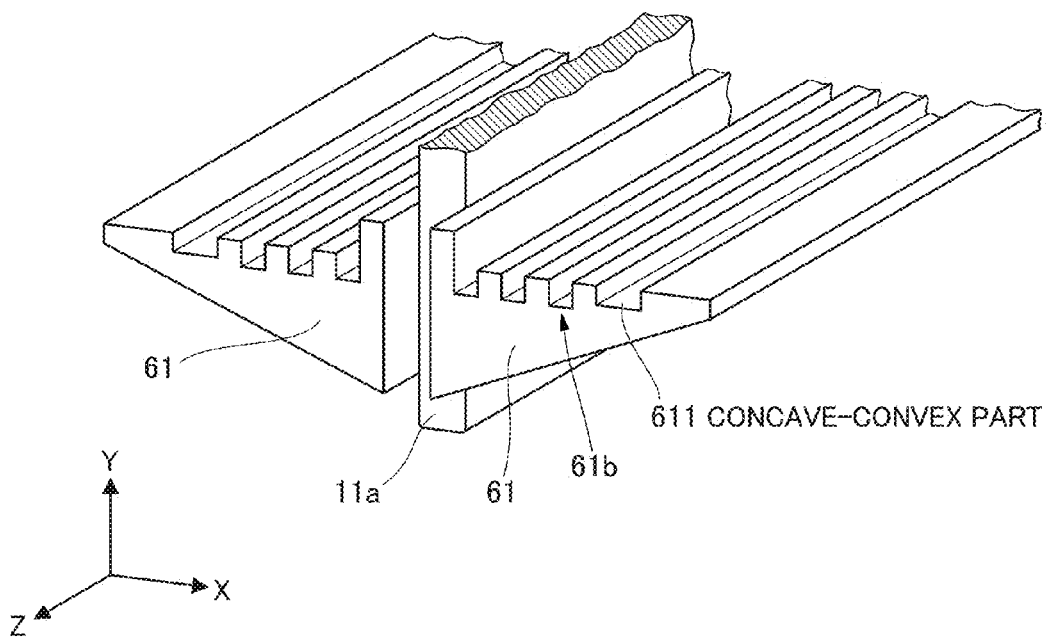
FIG. 16 is a drawing explaining the detailed configuration of the electrical insulating member.

Now, with reference to FIG. 16, the detailed configuration of the electrical insulating member 61 will be described. FIG. 16 is a drawing explaining the detailed configuration of the electrical insulating member 61. Here, the rectifying member 62 may be integrally formed with the electrical insulating member 61 as described above. FIG. 16 shows the electrical insulating member 61 integrally formed with the rectifying member 62. The configuration of the electrical insulating member 61 shown in FIG. 16, which is the same as that of the electrical insulating member 61 shown in FIGS. 6 to 9, will not be described again here.

The electrical insulating member 61 shown in FIG. 16 may include a concave-convex part 611. The concave-convex part 611 may be formed on a surface 61b of the electrical insulating member 61 in the second space 52b side.

As described above, the discharge efficiency of the gas laser apparatus 1 may be improved when the loop area of the discharge circuit of the gas laser apparatus 1 is reduced. Therefore, it is preferred that the loop area of the discharge circuit of the gas laser apparatus 1 is reduced as small as possible. Therefore, it is preferred that the size of the electrical insulating member 61 shown in FIGS. 6 to 9 is reduced. However, if the size of the electrical insulating member 61 is reduced, when the main discharge is generated in the gas laser apparatus 1, a discharge path may be easy to be formed between the wall 10c of the laser chamber 10 and the side surface of the first discharge electrode 11a through the surface of the electrical insulating member 61 in the second space 52b side. That is, when the electrical insulating member 61 is reduced in size, an abnormal discharge may be easy to be generated from the side surface of the first discharge electrode 11a toward the wall 10c of the laser chamber 10 through and along the surface of the electrical insulating member 61.

The electrical insulating member 61 shown in FIG. 16 has the surface on which the convex-concave part 611 is formed, and therefore the creepage distance for insulation between the side surface of the first discharge electrode 11a and the wall 10c may be increased. By this means, the gas laser apparatus 1 equipped with the electrical insulating member 61 shown in FIG. 16 can prevent the abnormal discharge generated from the side surface of the first discharge electrode 11a toward the wall 10c of the laser chamber 10 through and along the surface of electrical insulating member 61.

Moreover, the concave-convex part 611 may be formed on the surface 61b of the electrical insulating member 61, shown in FIG. 16, in the second space 52b side. Differently from the surface of the electrical insulating member 61 in the first space 51b side, the surface 61b of the electrical insulating member 61 in the second space 52b side may not affect the flow direction and the flow velocity of the laser gas flowing between the first discharge electrode 11a and the second discharge electrode 11b. Therefore, the gas laser apparatus 1 equipped with the electrical insulating member 61 shown in FIG. 16 can prevent a decrease in the flow velocity of the laser gas flowing between the first discharge electrode 11a and the second discharge electrode 11b.

10.2 Mounting Structure

Now, with reference to FIGS. 17A to 18C, mounting structures for mounting the electrical insulating member 61 shown in FIG. 16 to the laser chamber 10 will be described. These mounting structures may be applied in approximately the same manner to any of the laser chamber 10 shown in FIGS. 6 to 9 to which the electrical insulating member 61 is mounted.

FIGS. 17A to 18C show representative mounting structures of the electrical insulating member 61 applied when the electrical insulating member 61 is mounted to the laser chamber 10, shown in FIG. 9, formed by integrating the first container 51 and the second container 52. As described above, the internal space of the laser chamber 10 shown in FIG. 9 and formed as a single container may be partitioned into the first space 51b and the second space 52b by the partition plate 10d extending inward from the inner surface of the wall 10c of the laser chamber 10.

Figure 17A:
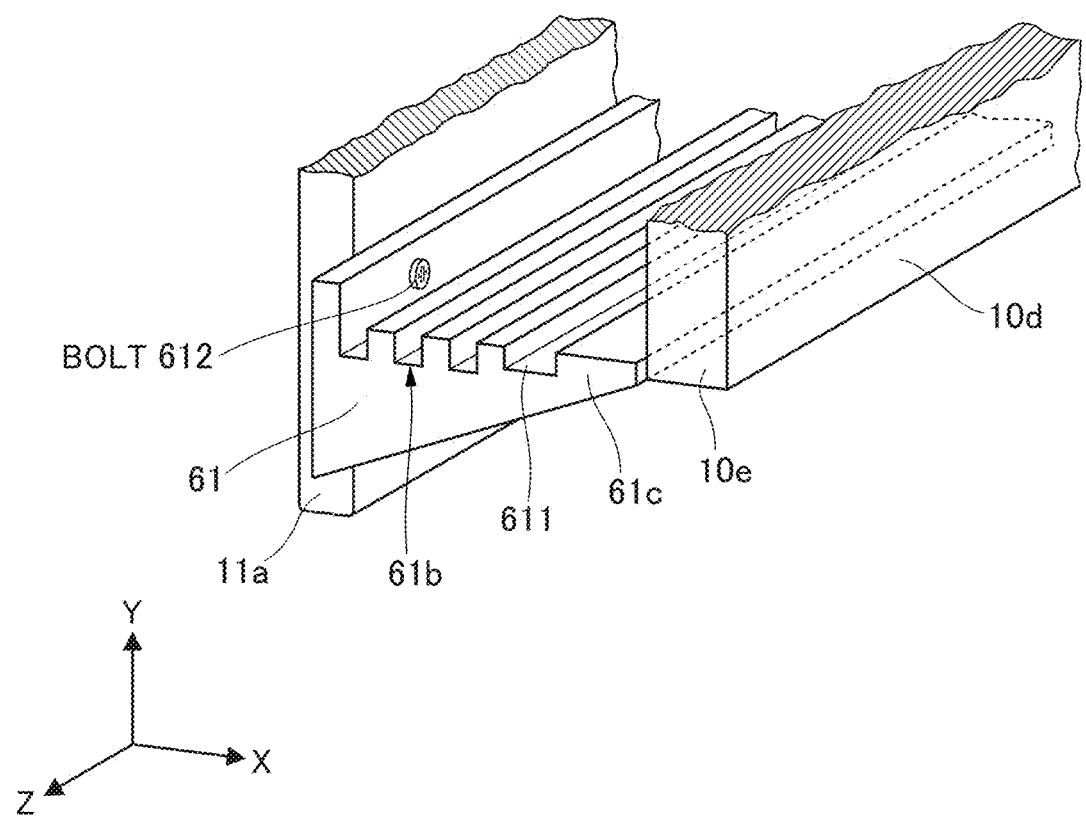
FIG. 17A is a drawing explaining an exemplary mounting structure 1 of the electrical insulating member.
Figure 17B:
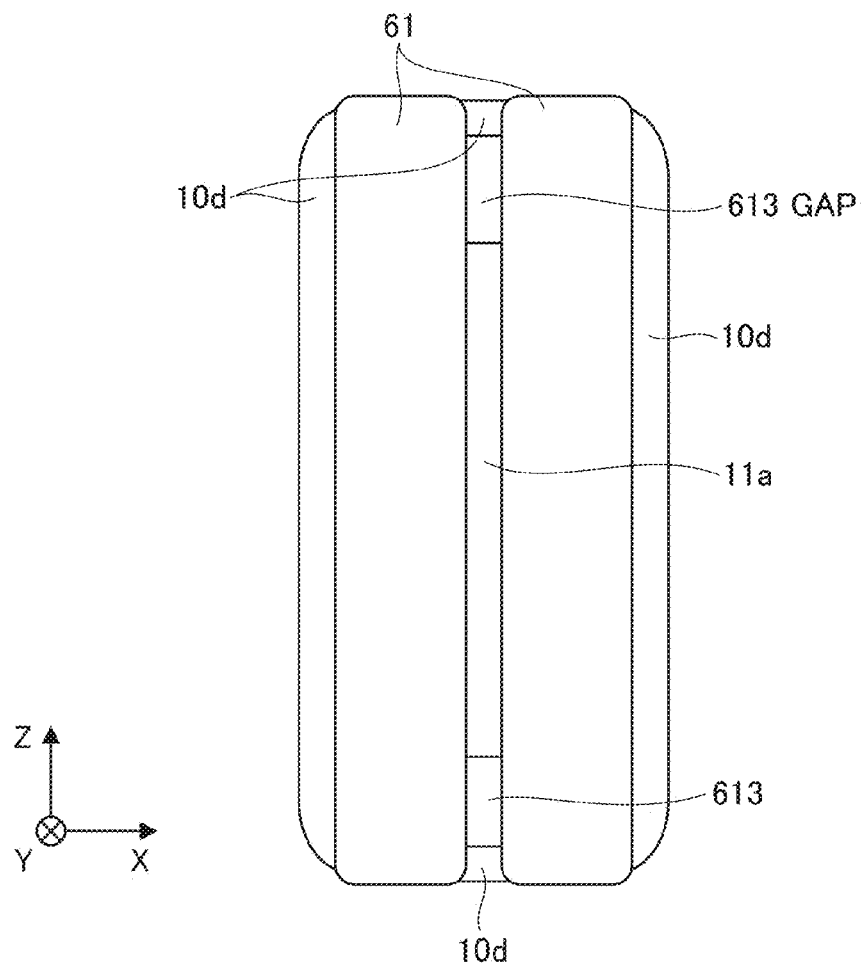
FIG. 17B is a drawing explaining the positional relationship among the electrical insulating member which is mounted according to the exemplary mounting structure 1 shown in FIG. 17A, a partition plate, and a first discharge electrode, as viewed toward a +Y-axis direction.
Figure 17C:
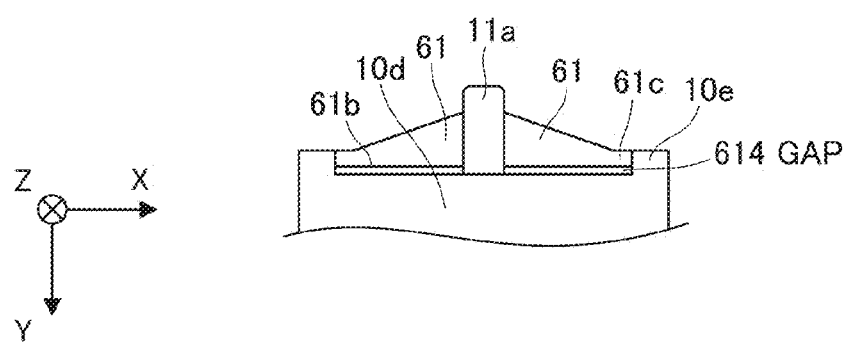
FIG. 17C is a drawing showing the electrical insulating member, the partition plate and the first discharge electrode shown in FIG. 17B, as viewed toward a +Z-axis direction.

FIG. 17A is a drawing explaining an exemplary mounting structure 1 of the electrical insulating member 61. FIG. 17B is a drawing explaining a positional relationship among the electrical insulating member 61 mounted according to the exemplary mounting structure 1 of FIG. 17A, the partition plate 10d, and the first discharge electrode 11a, as viewed toward a +Y-axis direction. FIG. 17C is a drawing showing the electrical insulating member 61, the partition plate 10d, and the first discharge electrode 11a shown in FIG. 17B, as viewed toward a +Z-axis direction. Here, the concave-convex part 611 is not shown in FIG. 17C.

As shown in FIG. 17A, the electrical insulating member 61 according to the exemplary mounting structure 1 may be fixed to the side surface of the first discharge electrode 11a with a bolt 612. The electrical insulating member 61 may be disposed such that its side portion 61c abuts on a top end portion 10e of the partition plate 10d. The electrical insulating member 61 may be disposed such that its side portion 61c abuts on the top end portion 10e of the partition plate 10d in an X-axis direction in which the laser gas flows. That is, the space between the side portion 61c of the electrical insulating member 61 and the top end portion 10e of the partition plate 10d may not be sealed with a seal member and so forth. By this means, the laser gas may pass through between the first space 51b and the second space 52b via the space between the side portion 61c and the top end portion 10e.

In addition, as shown in FIG. 17B, the electrical insulating member 61 may be formed such that the length of the electrical insulating member 61 in the longitudinal direction thereof is longer than the length of the first discharge electrode 11a in the longitudinal direction thereof. The electrical insulating member 61 may be disposed along the longitudinal direction of the first discharge electrode 11a. The electrical insulating member 61 may be disposed such that gaps 613 enclosed by the electrical insulating member 61, the first discharge electrode 11a and the partition plate 10d are formed near both ends of the first discharge electrode 11a in the longitudinal direction. By this means, the laser gas can pass through between the first space 51b and the second space 52b via the gaps 613.

Moreover, as shown in FIG. 17C, the electrical insulating member 61 may be disposed such that a gap 614 is formed between the surface 61b of the electrical insulating member 61 in the second space 52b side and the partition plate 10d. By this means, the laser gas can pass through between the first space 51b and the second space 52b via the gap 614.

The electrical insulating member 61 mounted according to the exemplary mounting structure 1 shown in FIGS. 17A to 17C can be disposed to allow the laser gas to pass through between the first space 51b and the second space 52b. Therefore, the electrical insulating member 61 according to the exemplary mounting structure 1 is not easy to be deformed due to a difference in the pressure between the first space 51b and the second space 52b, and consequently can be reduced in size and thickness. By this means, the gas laser apparatus 1 equipped with the electrical insulating member 61 according to the exemplary mounting structure 1 can reduce the loop area of the discharge circuit and therefore improve the discharge efficiency.

Meanwhile, if the laser gas cannot pass through between the first space 51b and the second space 52b, the laser gas in the second space 52b may not be easy to be circulated by the fan 21 disposed in the first space 51b, and therefore may stay in the second space 52b. Then, the laser gas staying in the second space 52b may deteriorate and cause an abnormal discharge. In the gas laser apparatus 1 equipped with the electrical insulating member 61 according to the exemplary mounting structure 1, the laser gas in the second space 52b can transfer to the first space 51b. Therefore, it is possible to prevent the laser gas from staying in the second space 52b, and consequently to prevent an abnormal discharge. By this means, even with a simple structure, the gas laser apparatus 1 equipped with the electrical insulating member 61 according to the exemplary mounting structure 1 can stabilize the main discharge, and therefore stabilize the pulse energy of the outputted laser beam.

Here, the electrical insulating member 61 according to the exemplary mounting structure 1 may not be disposed to abut on the partition plate 10d, but be spaced from the partition plate 10d. However, when the electrical insulating member 61 is disposed to abut on the partition plate 10d, the electrical insulating member 61 may not be easy to oscillate even though the flow velocity of the laser gas is increased in order to generate a discharge at a high repetition frequency. Then, the first discharge electrode 11a to which the electrical insulating member 61 is fixed may not also be easy to oscillate, and therefore the main discharge becomes more stable. For this reason, it is more preferred that the electrical insulating member 61 is disposed to abut on the partition plate 10d than being spaced from the partition plate 10d.

Figure 18A:
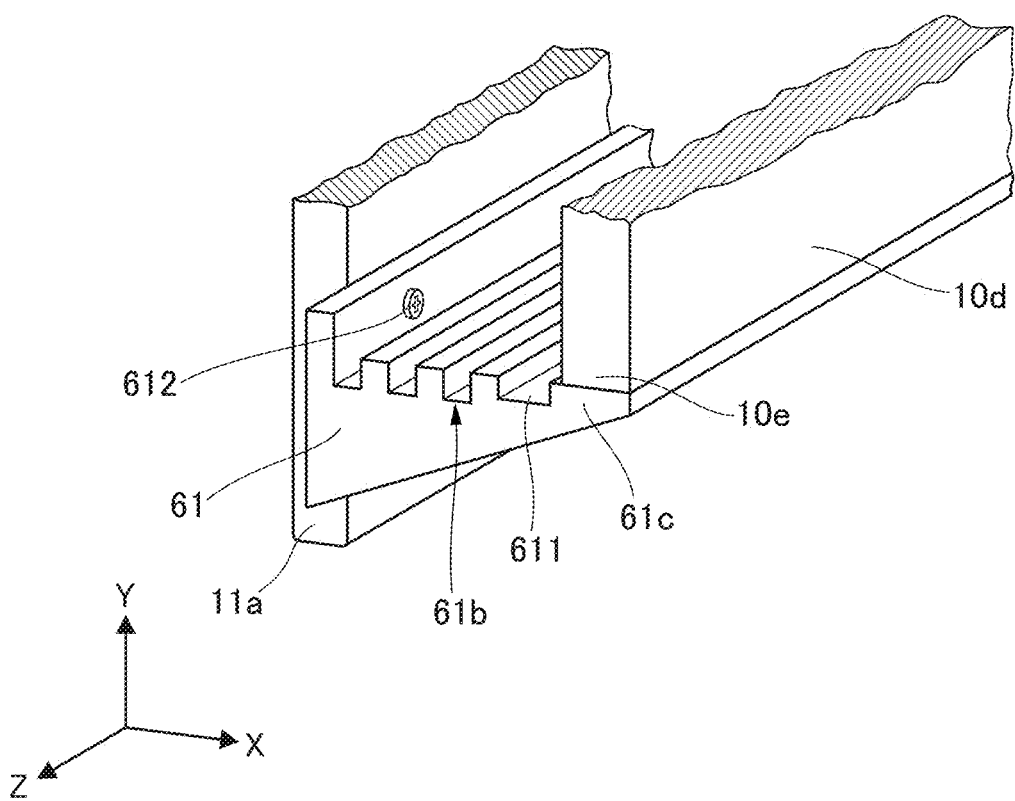
FIG. 18A is a drawing explaining an exemplary mounting structure 2 of the electrical insulating member.
Figure 18B:
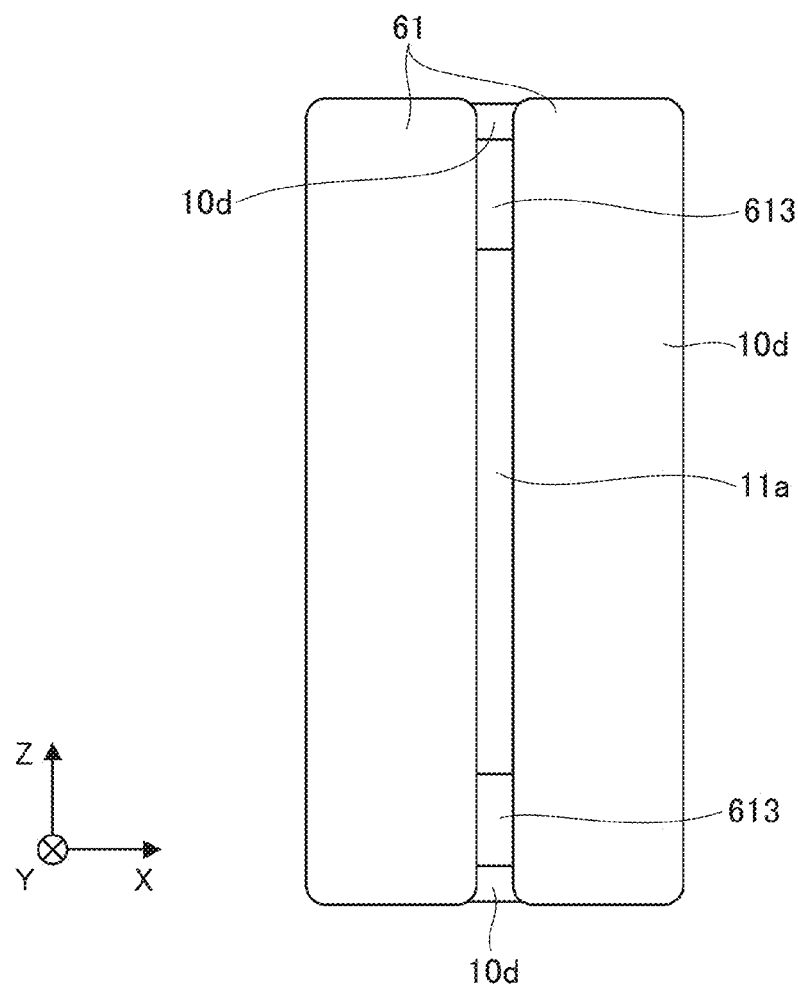
FIG. 18B is a drawing explaining the positional relationship among the electrical insulating member which is mounted according to the exemplary mounting structure 2 shown in FIG. 18A, the partition plate, and the first discharge electrode, as viewed toward the +Y-axis direction.
Figure 18C:
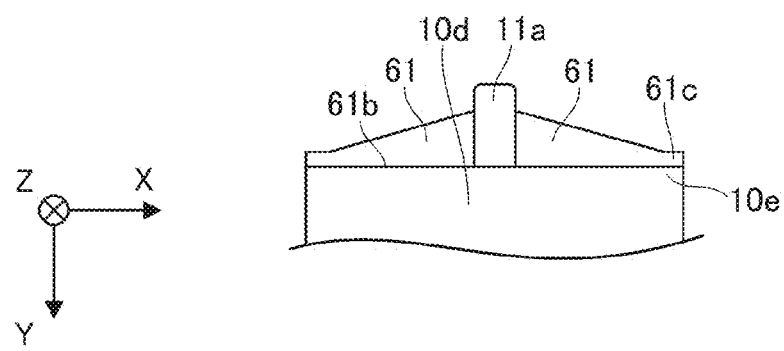
FIG. 18C is a drawing showing the electrical insulating member, the partition plate, and the first discharge electrode shown in FIG. 18B, as viewed toward the +Z-axis direction.

FIG. 18A is a drawing explaining an exemplary mounting structure 2 of the electrical insulating member 61. FIG. 18B is a drawing explaining a positional relationship among the electrical insulating member 61 which is mounted according to the exemplary mounting structure 2 of FIG. 18A, the partition plate 10d, and the first discharge electrode 11a, as viewed toward the +Y-axis direction. FIG. 18C is a drawing showing the electrical insulating member 61, the partition plate 10d, and the first discharge electrode 11a shown in FIG. 18B, as viewed toward the +Z-axis direction. Here, the concave-convex part 611 is not shown in FIG. 18C in the same way as FIG. 17C.

As shown in FIG. 18A, the electrical insulating member 61 according to the exemplary mounting structure 2 may be disposed such that the side portion 61c abuts on the top end portion 10e of the partition plate 10d in the Y-axis direction which is approximately perpendicular to the direction in which the laser gas flows. That is, the space between the side portion 61c of the electrical insulating member 61 and the top end portion 10e of the partition plate 10d may not be sealed with a seal member and so forth, in the same way as the exemplary mounting structure 1. In addition, as shown in FIG. 18B, the electrical insulating member 61 may be disposed to form the gaps 613, in the same way as the exemplary mounting structure 1. Here, as shown in FIG. 18C, the gap 614 may not be formed between the surface 61b of the electrical insulating member 61 in the second space 52b side and the partition plate 10d.

The other configuration of the electrical insulating member 61 according to the exemplary mounting structure 2 may be the same as the configuration of the electrical insulating member 61 according to the exemplary mounting structure 1.

Also the electrical insulating member 61 according to the exemplary mounting structure 2 shown in FIGS. 18A to 18C can be disposed to allow the laser gas to pass through between the first space 51b and the second space 52b, in the same way as the electrical insulating member 61 according to the exemplary mounting structure 1. By this means, also in the gas laser apparatus 1 equipped with the electrical insulating member 61 according to the exemplary mounting structure 2, it is possible to reduce the electrical insulating member 61 in size and thickness. Therefore, it is possible to reduce the loop area of the discharge circuit, and consequently to improve the discharge efficiency. Moreover, the gas laser apparatus 1 equipped with the electrical insulating member 61 according to the exemplary mounting structure 2 can also prevent the laser gas from staying in the second space 52b, and therefore prevent an abnormal discharge. Consequently, even with a simple structure, it is possible to stabilize the main discharge, and therefore to stabilize the pulse energy of the outputted laser beam.

Here, also the electrical insulating member 61 according to the exemplary mounting structure 2 may not be disposed to abut on the partition plate 10d, but be spaced from the partition plate 10d in the same way as the exemplary mounting structure 1. However, it is more preferred that the electrical insulating member 61 according to the exemplary mounting structure 2 is disposed to abut on the partition plate 10d than being spaced from the partition plate 10d, in the same way as the exemplary mounting structure 1.

As described above, the exemplary mounting structures 1 and 2 shown in FIGS. 17A to 18C are representative structural examples for mounting the electrical insulating member 61 to the laser chamber 10 shown in FIG. 9. However, a mounting structure which is approximately the same as the exemplary mounting structures 1 and 2 shown in FIGS. 17A to 18C may be applied to mount the electrical insulating member 61 to the laser chamber 10 shown in FIGS. 6 to 8.

To be more specific, as described above, the laser chamber shown in FIGS. 6 to 8 may include the first container 51 having the first space 51b therein and the second container 52 having the second space 52b therein. Then, in the laser chamber 10 shown in FIGS. 6 to 8, the peripheries of the openings of the first container 51 and the second container 52 may be bonded to one another through the seal member 53 as described above. When the electrical insulating member 61 is mounted to the laser chamber shown in FIGS. 6 to 8, the electrical insulating member 61 may be disposed such that the side portion 61c of the electrical insulating member 61 abuts on the periphery of the opening of the first container 51 bonded to the periphery of the opening of the second container 52, or on the periphery of the opening of the second container 52. By this means, it is possible to dispose the electrical insulating member 61, which is to be mounted in the laser chamber 10 shown in FIGS. 6 and 8, to allow the laser gas to pass through between the first space 51b and the second space 52b, and to reduce the electrical insulating member 61 in size and thickness. Therefore, even in the gas laser apparatus 1 shown in FIGS. 6 to 9 equipped with the electrical insulating member 61 which is mounted according to the exemplary mounting structures 1 or 2, it is possible to reduce the loop area of the discharge circuit, and consequently to improve the discharge efficiency. In addition, the gas laser apparatus 1 can prevent the laser gas from staying in the second space 52b, and therefore to prevent an abnormal discharge. Consequently, even with a simple structure, it is possible to stabilize the main discharge, and therefore to stabilize the pulse energy of the outputted laser beam.

11. Others 11.1 Charge and Discharge Circuit Used in the Gas Laser Apparatus

Figure 19:
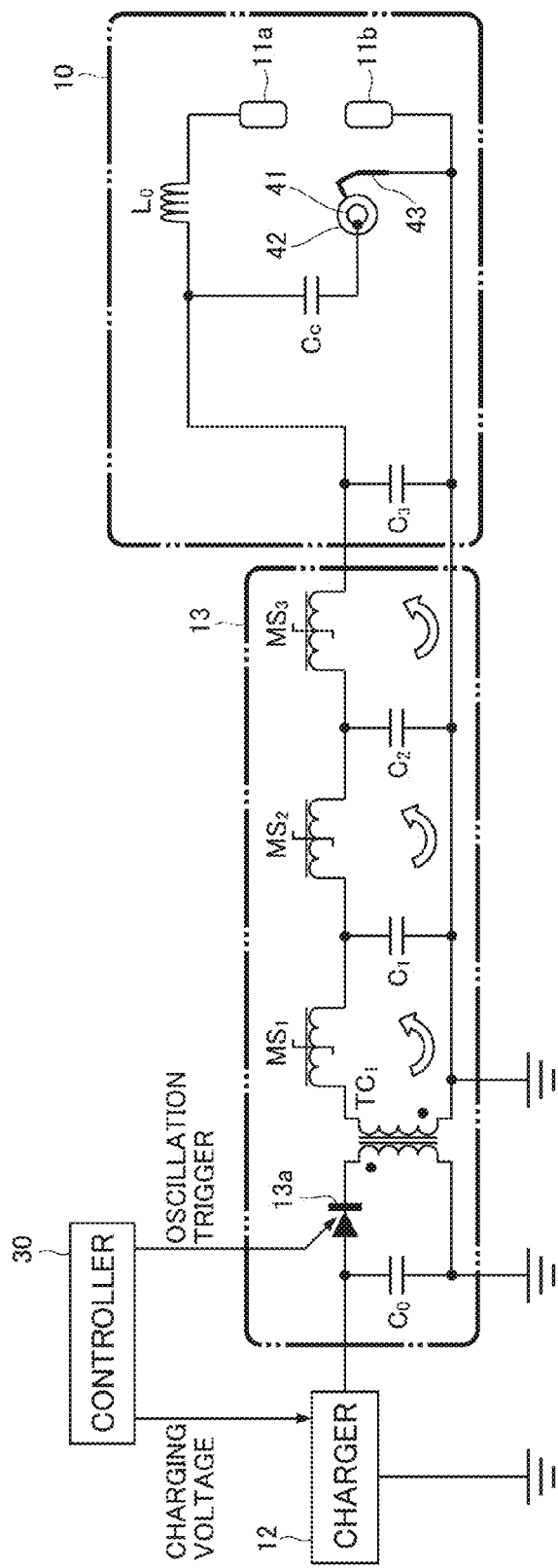
FIG. 19 is a drawing explaining the circuit configuration of a charge and discharge circuit used in the gas laser apparatus.

Now, with reference to FIG. 19, a charge and discharge circuit used in the gas laser apparatus 1 will be described. FIG. 19 is a drawing explaining the circuit configuration of the charge and discharge circuit used in the gas laser apparatus 1.

The PPM 13 may include a semiconductor switch as the above-described switch 13a, a transformer $TC_1$, magnetic switches $MS_1$ to $MS_3$, the charging condenser $C_0$, and condensers $C_1$ and $C_2$. The condenser $C_c$ and a condenser $C_3$ may be disposed in the laser chamber 10. The condenser $C_3$ may be the peaking condenser 18. The condenser $C_c$ may be a preliminary ionization condenser. When the value of the time integration of the voltage applied to the magnetic switches $MS_1$ to $MS_3$ reaches a threshold value, a current may be easy to flow to the magnetic switches $MS_1$ to $MS_3$. The threshold value may be different for each of the magnetic switches. With the present embodiment, the state in which the magnetic switches $MS_1$ to $MS_3$ are easy to flow a current therethrough may be described as "the magnetic switch is closed."

The switch 13a may be provided between the primary side of the transformer $TC_1$ and the charging condenser $C_0$. The magnetic switch $MS_1$ may be provided between the secondary side of the transformer $TC_1$ and the condenser $C_1$. The magnetic switch $MS_2$ may be provided between the condenser $C_1$ and the condenser $C_2$. The magnetic switch $MS_3$ may be provided between the condenser $C_2$ and the condenser $C_3$. The primary side and the secondary side of the transformer $TC_1$ may be electrically insulated from one another. The direction of the winding of the primary side of the transformer $TC_1$ may be opposite to that of the secondary side.

The second discharge electrode 11b and the preliminary ionization outer electrode 43 may be connected to ground. A voltage-dividing circuit including the condenser $C_c$ may be connected in parallel to the first discharge electrode 11a and the second discharge electrode 11b. The condenser $C_c$ may be connected in series to the preliminary ionization inner electrode 41, the dielectric pipe 42 and the preliminary ionization outer electrode 43.

Now, the operation of the charge and discharge circuit shown in FIG. 19 will be described. The controller 30 may set the charging voltage Vhv in the charger 12. The charger 12 may charge the charging condenser $C_0$ based on the charging voltage Vhv set therein. The controller 30 may output an oscillation trigger signal to the switch 13a of the PPM 13. Upon receiving the oscillation trigger signal, the switch 13a of the PPM 13 may be turned on. When the switch 13a is turned on, the charging condenser $C_0$ may flow a current to the primary side of the transformer $TC_1$.

When the current flows in the primary side of the transformer $TC_1$, a current in the opposite direction may flow in the secondary side of the transformer $TC_1$ due to electromagnetic induction. When the current flows in the secondary side of the transformer $TC_1$, the value of the time integration of the voltage applied to the magnetic switch $MS_1$ eventually reaches a threshold value. When the value of the time integration of the voltage applied to the magnetic switch $MS_1$ reaches a threshold value, a magnetic saturation occurs in the magnetic switch $MS_1$, and therefore the magnetic switch $MS_1$ may be closed. When the magnetic switch $MS_1$ is closed, the current flows from the secondary side of the transformer $TC_1$ to the condenser $C_1$, so that the condenser $C_1$ may be charged.

After the condenser $C_1$ is charged, a magnetic saturation may occur in the magnetic switch $MS_2$, and therefore the magnetic switch $MS_2$ may be closed. When the magnetic switch $MS_2$ is closed, the current may flow from the condenser $C_1$ to the condenser $C_2$, and therefore the condenser $C_2$ may be charged. In this case, the condenser $C_2$ may be charged with the pulse width of the current shorter than the pulse width of the current for charging the condenser $C_1$.

After the condenser $C_2$ is charged, a magnetic saturation may occur in the magnetic switch $MS_3$, and therefore the magnetic switch $MS_3$ may be closed. After the magnetic switch $MS_3$ is closed, the current may flow from the condenser $C_2$ to the condenser $C_3$, and therefore the condenser $C_3$ may be charged. In this case, the condenser $C_3$ may be charged with the pulse width of the current shorter than the pulse width of the current for charging the condenser $C_2$.

As described above, the current flows from the condenser $C_1$ to the condenser $C_2$, and then from the condenser $C_2$ to the condenser $C_3$ in sequence, and therefore the pulse width of the current may be compressed.

After being charged, the condenser $C_3$ may apply a pulse voltage between the first discharge electrode 11a and the second discharge electrode 11b.

The voltage-dividing circuit connected in parallel to the first discharge electrode 11a and the second discharge electrode 11b may divide the pulse voltage applied between the first discharge electrode 11a and the second discharge electrode 11b. The range of the divided pulse voltage may be 25% to 75% of the pulse voltage applied between the first discharge electrode 11a and the second discharge electrode 11b. The divided pulse voltage may be applied between the preliminary ionization inner electrode 41 and the preliminary ionization outer electrode 43. The time constant of the voltage-dividing circuit may be adjusted to a desired value by adjusting the division ratio of the voltage-dividing circuit, the capacitance of the condenser $C_c$, and the inductance of the inductor $L_0$. By this means, it is possible to adjust the timing of the preliminary ionization discharge for the main discharge. The combined capacitance of the condensers in the voltage-dividing circuit may be adjusted to be equal to or lower than 10% of the capacitance of the condenser $C_3$. When the pulse voltage is applied to between the preliminary ionization inner electrode 41 and the preliminary ionization outer electrode 43, a corona discharge may be generated on the surface of the dielectric pipe 42. Then, the laser gas in the discharge space of the main discharge part 11 may be preliminarily ionized by UV light generated by this corona discharge.

When the pulse voltage applied to between the first discharge electrode 11a and the second discharge electrode 11b is greater than the dielectric strength voltage of the laser gas, the insulation breakdown of the laser gas may occur. When the insulation breakdown of the laser gas occurs, a main discharge may be generated between the first discharge electrode 11a and the second discharge electrode 11b. In this case, a negative potential may be applied to the first discharge electrode 11a.

11.2 Modification

The gas laser apparatus 1 may not be an excimer laser apparatus, but be a fluorine molecule laser apparatus using fluorine gas and buffer gas as the laser gas.

The first discharge electrode 11a may not be a cathode electrode but be an anode electrode. The second discharge electrode 11b may not be an anode electrode but be a cathode electrode. In this case, for example, by making the direction of the winding of the primary side the same as the direction of the winding of the secondary side of the transformer $TC_1$ of the PPM 13, the first discharge electrode 11a and the second discharge electrode 11b may become an anode electrode and a cathode electrode, respectively.

It would be obvious to a person skilled in the art that the technologies described in the above-described embodiments including the modifications may be compatible with each other.

The descriptions above are intended to be illustrative only and the present disclosure is not limited thereto. Therefore, it will be apparent to those skilled in the art that it is possible to make modifications to the embodiments of the present disclosure within the scope of the appended claims.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "a/an" in this specification and the appended claims should be interpreted as "at least one" or "one or more."

REFERENCE SIGNS LIST 1 gas laser apparatus
10 laser chamber
10c wall
10d partition plate
11 main discharge part
11a first discharge electrode
11b second discharge electrode
18 peaking condenser
21 fan
30 controller
51 first container
51b first space
52 second container
52b second space
54 refrigerant flow path
61 electrical insulating member
611 concave-convex part
62 rectifying member

The invention claimed is:

1. A laser chamber including a first space and a second space in communication with the first space, the laser chamber comprising:
a first discharge electrode disposed in the first space;
a second discharge electrode disposed in the first space to face the first discharge electrode;
a fan disposed in the first space and configured to flow laser gas between the first discharge electrode and the second discharge electrode;
a peaking condenser disposed in the second space; and
an electrical insulating member configured to partition the first space and the second space from one another, and disposed to allow the laser gas to pass through between the first space and the second space.

2. The laser chamber according to claim 1, wherein:
a refrigerant flow path through which a refrigerant flows is provided in a wall of the laser chamber forming the second space; and
the peaking condenser is connected to the wall of the laser chamber in which the refrigerant flow path is provided.

3. The laser chamber according to claim 1, further comprising a rectifying member disposed upstream and downstream of flow of the laser gas with respect to the first discharge electrode.

4. The laser chamber according to claim 1, wherein a concave-convex part is formed on a surface of the electrical insulating member in the second space side.

5. The laser chamber according to claim 1, further comprising:
a first container having the first space therein; and a second container having the second space therein, wherein:

the first space and the second space communicate with one another by bonding a periphery of an opening of the first container to a periphery of an opening of the second container; and the electrical insulating member is disposed to abut on the periphery of the opening of the first container or the periphery of the opening of the second container.

6. The laser chamber according to claim 1, further comprising:

a container having one internal space; and a partition plate formed to extend inward from an inner wall of the container to partition the internal space into the first space and the second space, wherein the electrical insulating member is disposed to abut on a top end of the partition plate.

* * * * *